United States Patent
Russell

[11] Patent Number: 5,946,967
[45] Date of Patent: Sep. 7, 1999

[54] AUTOMATIC MONITORING SYSTEM FOR A SEPARATION RESERVOIR

[75] Inventor: James M. Russell, Sandwich, Mass.

[73] Assignee: Worldstone, Inc., Sandwich, Mass.

[21] Appl. No.: 08/661,414

[22] Filed: Jun. 7, 1996

[51] Int. Cl.$^6$ .................................................. G01F 23/00
[52] U.S. Cl. ............................................................. 73/290 R
[58] Field of Search .................. 73/290 V; 367/908, 367/108, 99

[56] References Cited

U.S. PATENT DOCUMENTS

| | | |
|---|---|---|
| 2,746,480 | 5/1956 | Hildyard . |
| 3,025,962 | 3/1962 | Williams . |
| 3,486,377 | 12/1969 | Franchi . |
| 4,000,650 | 1/1977 | Snyder . |
| 4,121,094 | 10/1978 | DiVito et al. . |
| 4,182,177 | 1/1980 | Prough ................................. 73/290 V |
| 4,319,998 | 3/1982 | Anderson . |
| 4,572,253 | 2/1986 | Farmer et al. . |
| 5,036,703 | 8/1991 | Erikson ................................. 73/290 V |
| 5,076,100 | 12/1991 | Hunter et al. ........................ 73/290 V |
| 5,127,266 | 7/1992 | Maresca et al. ..................... 73/290 V |

Primary Examiner—George Dombroske
Assistant Examiner—Jewel V. Thompson
Attorney, Agent, or Firm—Iandiorio & Teska; Brian J. Colandreo

[57] ABSTRACT

The monitoring system for a separation reservoir containing at least two mediums, at least one medium floating on another medium includes: means for determining the levels of the upper and lower boundaries of the floating medium; means, responsive to the means for determining, for comparing the upper and lower boundary levels to reference levels in the separation reservoir; and means, responsive to the means for comparing, for indicating the condition of the reservoir.

42 Claims, 12 Drawing Sheets

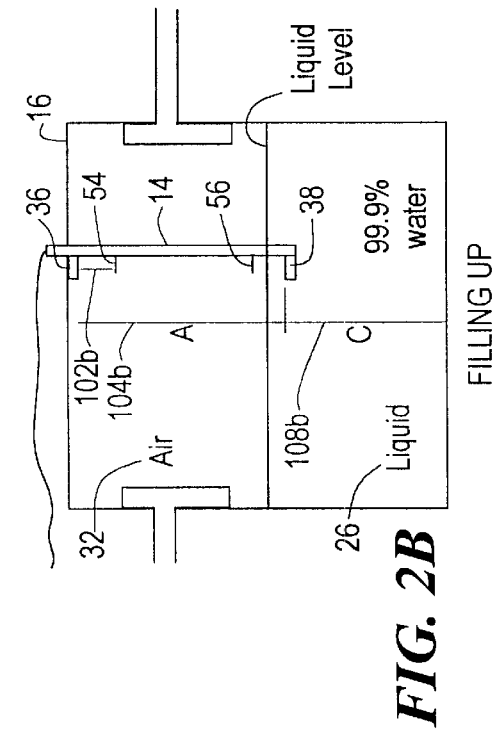
FIG. 2B FILLING UP
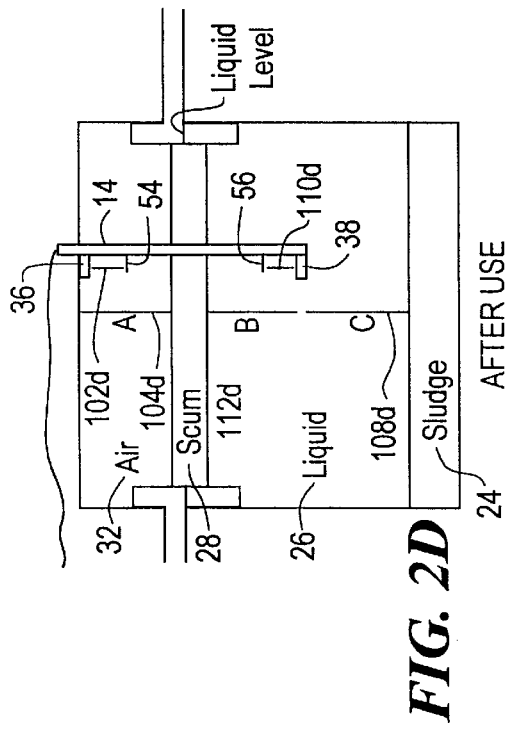
FIG. 2D AFTER USE
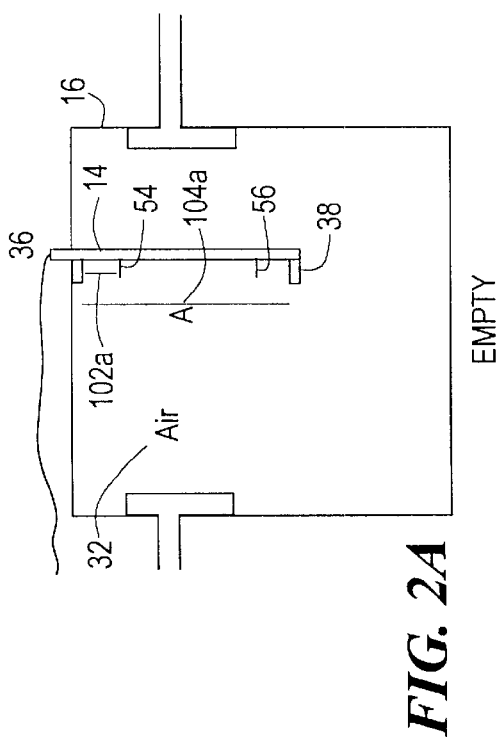
FIG. 2A EMPTY
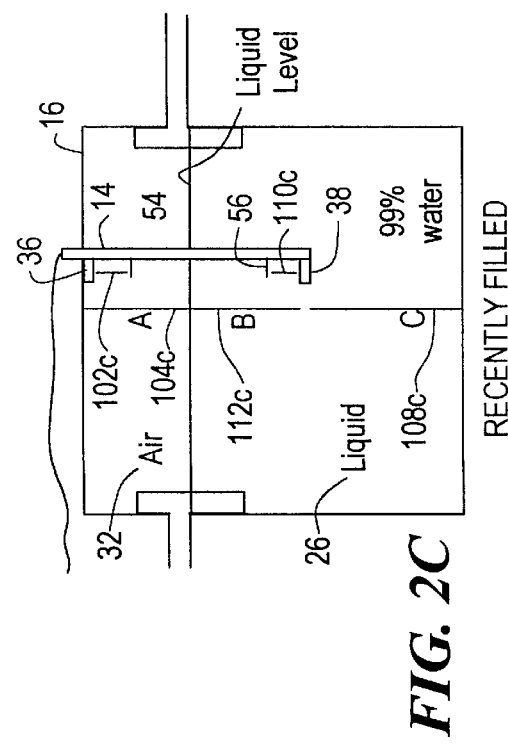
FIG. 2C RECENTLY FILLED

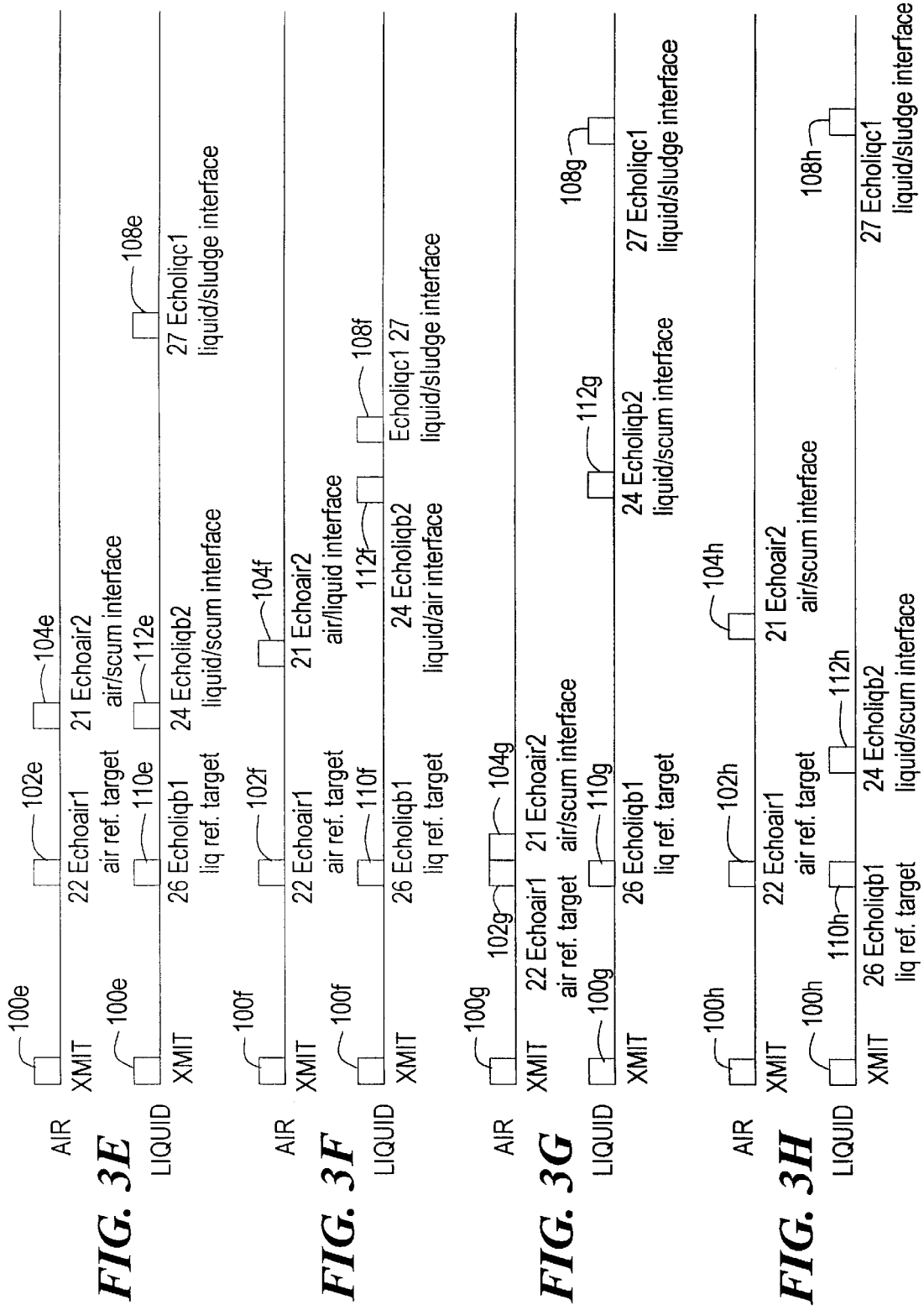

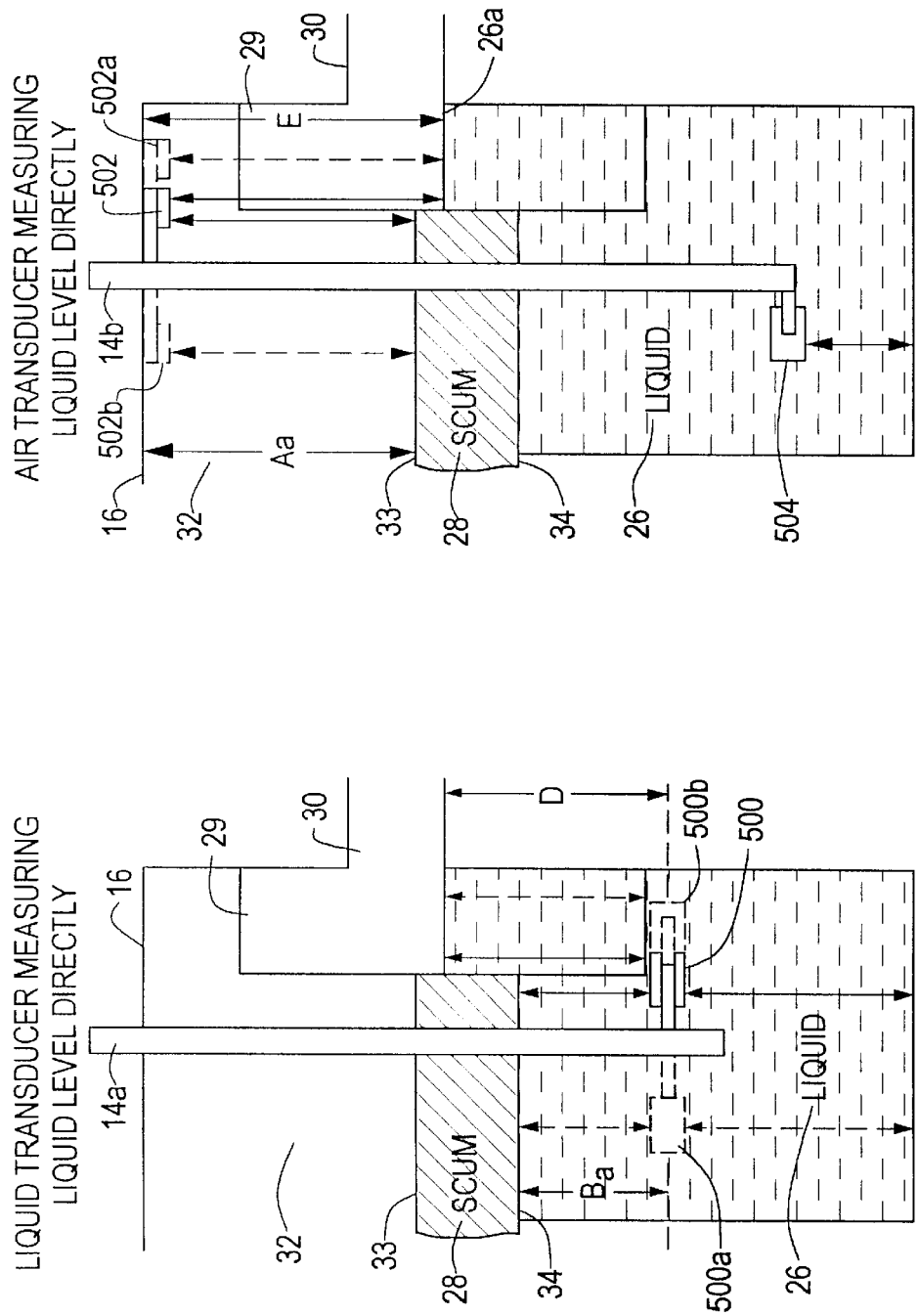

AUTOMATIC MONITORING SYSTEM FOR A SEPARATION RESERVOIR

FIELD OF INVENTION

This invention relates to an automatic monitoring system for a separation reservoir and more particularly to such a system which monitors the levels of both boundaries of a floating medium, e.g. a scum layer, and the levels of other mediums within the separation reservoir to provide an indication of the condition of the reservoir.

BACKGROUND OF INVENTION

Reservoirs, such as in septic systems, greasetraps, and other effluent disposal systems, accumulate mediums of differing levels and thicknesses such as gases, liquids, solids and semi-solid materials. These types of reservoirs receive incoming waste which settles or separates into discrete levels of different mediums. Typically, there is a medium which floats on top of one of the other mediums. For example, in a septic system there is normally present a scum layer floating on top of the liquid within the reservoir or in a greasetrap there is present a layer of grease and other solid and semi-solid material floating on top of a liquid medium within the reservoir. These reservoirs require periodic maintenance and service based on the levels of the boundaries of the floating medium, the thickness of the floating medium and the levels of the other mediums relative to one another and relative to the dimensions of the reservoir. However, because the reservoirs are buried, access is often difficult, and routine inspections are rare, many years can pass before service is requested or even known to be required. Very often it is not known that service is required until the reservoir has overflowed.

Reservoirs in septic systems receive entering waste water carrying solids. A portion of the solids settle to the bottom of the reservoir and become sludge and a portion of the solids float to the surface to form a layer of scum. Over time, depending on various factors like individual use, reservoir size and site conditions, these solids accumulate and displace a portion of the available reservoir volume creating less settling capacity for the incoming waste liquid and bringing the solid levels closer to the outlet openings of the reservoir. Diminished settling capacity and close proximity of solids to the outlet increase the levels of solids reaching the drainage field which clogs the field and decreases its drainage capacity. Before the solids reach this level, the reservoir should be cleaned. Close proximity of floating solids to the reservoir outlet can also be caused by a change in the liquid level of the reservoir due to either a leak which lowers the scum layer to the bottom outlet opening, or a lowered leaching capacity backing up the system and raising the scum layer to over the top of the outlet. In both cases, the scum layer may actually enter the outlet and clog the drainage field. Thus, detection of rising and lowering liquids over time is helpful in predicting and preventing eventual reservoir or drainage field overflows and waste water backup into nearby buildings.

In addition to the proximity of floating solids to the reservoir outlet and the total solid volume in the reservoir, there are other parameter levels which, when exceeded, indicate that the reservoir should be cleaned. An example of this is the proximity of the sludge level to the outlet. This level could reach a point, regardless of the proximity of floating solids to the outlet, which would necessitate cleaning of the reservoir.

One system, described in U.S. Pat. No. 4,121,094, monitors only the level of the sludge in the reservoir and operates a sludge removal pump when the sludge reaches a predetermined level. Another system, described in U.S. Pat. No. 4,319,998, uses a float located in-line with the outlet pipe from the reservoir to monitor the liquid level rise inside an enclosure caused by the presence of sludge, indicating that the system requires servicing.

However, these systems do not have the capability of monitoring the level and thickness of the scum layer floating on the surface of the waste liquid or other parameters, such as total solid volume and the proximity of sludge to the outlet, and therefore are not capable of providing a complete and accurate assessment of the condition of the reservoir. That is, these prior art systems only monitor one condition, i.e. sludge level, and do not monitor, inter alia, the level and thickness of the scum layer and other important parameters in the reservoir, which, if they reach unacceptable levels indicate that the reservoir should be cleaned.

Another system, described in U.S. Pat. No. 3,025,962, includes two light-sensitive cells, one is used to determine when the bottom layer of scum has reached a certain level and the second light cell is used to determine when the sludge layer has reached a preset height. The light sensitive cells include light sources and light detectors. When either the scum or the sludge layer reaches the respective light-sensitive cells, they interfere with the transmission of light from the sources to the detectors. When this occurs it indicates that either the sludge layer or the scum layer has reached an unacceptable level. That system has a number of shortcomings, however. The detectors of the light-sensitive cells include windows which allows the light emanating from the light sources to pass therethrough. Very often the windows become dirty and cause false readings. In addition, that system does not monitor the liquid level or the top of the scum layer or their distances to the top of the outlet baffle. Moveover, it cannot detect incremental changes in any of the various layered material in the reservoir as it only detects two basic states inside the reservoir and it does not monitor and display changes in the layered material levels relative to one another or relative to the reservoir over time. It also does not store an historical record of the layered material levels. In short, that system is not capable of providing a complete and accurate assessment of the condition of a reservoir.

SUMMARY OF INVENTION

It is therefore an object of this invention to provide an automatic monitoring system for determining the level and thickness of both boundaries of a floating medium in a reservoir to provide an indication of the condition of the reservoir.

It is a further object of this invention to provide such an automatic monitoring system which monitors the level and thickness of each medium within the reservoir.

It is a further object of this invention to provide such an automatic monitoring system which provides ongoing information regarding the condition of the reservoir and indicates when routine or emergency service is required based on a number of reservoir parameters.

It is a further object of this invention to provide such an automatic monitoring system which is very easy to use.

It is a further object of this invention to provide such an automatic monitoring system which is capable of storing a history of reservoir parameters and data for use in diagnosing past, present and potential future reservoir performance.

It is a further object of this invention to provide such an automatic monitoring system which is capable of locally or remotely uploading and downloading parameters, data, diagnostics and programs to facilitate servicing applications.

It is a further object of this invention to provide such an automatic monitoring system which has the capability to activate an effluent pump when service is required or to automatically add additives to the reservoir when a predetermined solid or liquid level or thickness is reached.

This invention results from the realization that the condition of a separation reservoir containing at least two mediums, at least one medium floating on another medium, may be easily and accurately monitored by determining the levels of both the upper and lower boundaries of the floating medium, comparing the determined upper and lower boundary levels to reference levels in the separation reservoir and from the comparison indicating the condition of the reservoir.

This invention results from the further realization that in order to obtain a complete assessment of the condition of a separation reservoir the levels and thicknesses of all the mediums in the reservoir must be monitored and this is achieved in this invention by determining the levels of all of the medium interfaces in the reservoir and from known geometries of the reservoir determining the levels and thicknesses of all of the mediums within the reservoir.

This invention features a monitoring system for a separation reservoir containing at least two mediums, at least one medium floating on another medium. There are means for determining the levels of the upper and lower boundaries of the floating medium. There are means, responsive to the means for determining, for comparing the upper and lower boundary levels to reference levels in the separation reservoir. And, there are means, responsive to the means for comparing, for indicating the condition of the reservoir.

In a preferred embodiment the means for determining may include first transducer means for determining the level of the upper boundary of the floating medium and second transducer means for determining the level of the lower boundary and means, responsive to the first and second transducer means, for determining the level of a second medium in the reservoir. The means for determining may include first transducer means for determining the level of one of the upper and lower boundary levels of the floating medium and second transducer means for determining the level of a second medium and means, responsive to the first and second transducer means, for determining the level of the other of the upper and lower boundary levels of the floating medium. The means for determining may include transducer means for determining the level of one of the upper and lower boundary levels of the floating medium, means for determining the level of a second medium and means, responsive to the determined level of one of the first and second boundaries and the level of the second medium, for determining a level of the other of the upper and lower boundary levels. The means for comparing may include means for comparing the upper boundary level to a floating medium upper reference level and for comparing the lower boundary level to a floating medium lower reference level. The means for indicating the condition of the reservoir may include means for identifying when either the upper boundary level exceeds the floating medium upper reference level or the lower boundary level falls below the floating medium lower reference level. The means for indicating the condition of the reservoir may further include means, responsive to the means for identifying, for displaying that service of the reservoir is required when the upper boundary level exceeds the upper reference level or when the lower boundary level falls below the lower boundary reference level. The means for indicating may include means for displaying the upper and lower boundary levels relative to the upper and lower boundary reference levels.

There may further be included means, responsive to the means for determining, for calculating the thickness of the floating medium. The means for calculating may include means for comparing the thickness of the floating medium to a predefined floating medium maximum thickness. The means for indicating the condition of the reservoir may include means for displaying the thickness of the floating medium in relation to the predefined maximum thickness of the floating medium. The means for comparing may include means for comparing the level of the second medium to a second medium upper reference level and a second medium lower reference level. The means for indicating may include means for identifying when the level of the second medium either exceeds the second medium upper reference level or falls below the second medium lower reference level. The means for indicating may further include means, responsive to the means for identifying, for displaying that service of the reservoir is required when the level of the second medium exceeds the second medium upper reference level or falls below the second medium lower reference level. The means for indicating may include means for displaying the level of the second medium relative to the second medium upper reference level and the second medium lower reference level.

The second transducer means may include means for determining the level in the reservoir of a third medium accumulated on the bottom of the reservoir. The means for determining the level of the third medium may include transducer means. The first transducer means may include means for determining the level in the reservoir of a third medium accumulated on the bottom of the reservoir. The means for determining may further include third transducer means for determining the level in the reservoir of a third medium accumulated on the bottom of the reservoir. The means for determining may include second transducer means for determining the level in the reservoir of a third medium accumulated on the bottom of the reservoir. The transducer means may include means for determining the level of the reservoir of a third medium accumulated on the bottom of the reservoir. The means for comparing may include means for comparing the level of the third medium to a third medium reference level. The means for indicating may include means for identifying when the level of the third medium exceeds the third medium reference level. The means for indicating may include means, responsive to the means for identifying, for displaying that service of the reservoir is required when the level of the third medium exceeds the third medium reference level. The means for indicating may include means for displaying the level of the third medium relative to the third medium reference level. There may further be included means, responsive to the means for determining the level in the reservoir of the third medium, for calculating the thickness of the third medium in the reservoir. The means for calculating may include means for comparing the total thickness of the third medium to a predefined third medium maximum thickness. The means for indicating the condition of the reservoir may further include means for identifying when the predefined third medium maximum thickness is exceeded. The means for indicating may further include means, responsive to the means for identifying when the predefined third medium maximum thickness is exceeded, for displaying that service of the reservoir is required when the predefined third medium maximum thickness is exceeded. The means for indicating may include means for displaying the total thickness of the third medium relative to the predefined third medium maximum thickness.

There may further be included means, responsive to the means for determining, for calculating the thicknesses of the floating medium and a third medium in the reservoir. The means for calculating may include means for comparing the combined thickness of the floating medium and the third medium to a predefined maximum combined thickness. The means for indicating the condition of the reservoir may further include means for identifying when the predefined maximum combined thickness is exceeded. The means for indicating may further include means, responsive to the means for identifying, for displaying that service of the reservoir is required when the predefined maximum combined thickness is exceeded. The means for indicating may include means for displaying the combined thickness of the floating medium and the third medium relative the predefined maximum combined thickness. The floating medium may be a scum layer. The second medium may be a liquid. The third medium may be a sludge layer. And the separation reservoir may be a septic tank. The means for determining may include first transducer means for determining the level of the upper boundary of the floating medium and second transducer means for determining the level of the lower boundary of the floating medium.

This invention also features an automatic monitoring system for determining the level of three medium interfaces formed by four different mediums in a reservoir. There are first transducer means for directing a first detection signal toward the first medium interface and for receiving the first detection signal reflected from the first medium interface. There are second transducer means for directing a second detection signal toward the second medium interface and for receiving the second detection signal reflected from the second medium interface. There are third transducer means for directing a third detection signal toward the third medium interface and for receiving the third detection signal reflected from the third medium interface. There are calculator means, responsive to the first, second and third transducer means, for determining the levels of the three medium interfaces in the reservoir. There are also indicator means, responsive to the levels of the three medium interfaces, for indicating the condition of the reservoir.

This invention further features a liquid level monitoring system for a reservoir adapted for containing a liquid. The system includes a first, air transducer means for directing a first detection signal toward the bottom of the reservoir and for receiving a reflected first detection signal. There is a second, liquid transducer means for directing a second detection signal toward the top of the reservoir and for receiving a reflected second detection signal. And there are calculator means, responsive to the first and second transducers means, for determining the level of liquid in the reservoir.

DISCLOSURE OF PREFERRED EMBODIMENT

Other objects, features and advantages will occur to those skilled in the art from the following description of a preferred embodiment and the accompanying drawings, in which:

FIGS. 2A–2H are cross-sectional views of the separation reservoir of FIG. 1 in a number of various conditions;

FIGS. 3A–3H are transducer echo timing diagrams for the transmitted and received transducer signals corresponding to the different states of the separation reservoir shown in FIGS. 2A–2H.

FIG. 7A is a schematic side elevational view of an alternative transducer configuration;

FIG. 7B is a schematic side elevational view of another alternative transducer configuration;

Although specific features of this invention are shown in some drawings and not others, this is for convenience only as each feature may be combined with any or all of the other features in accordance with the invention.

Figure 1:
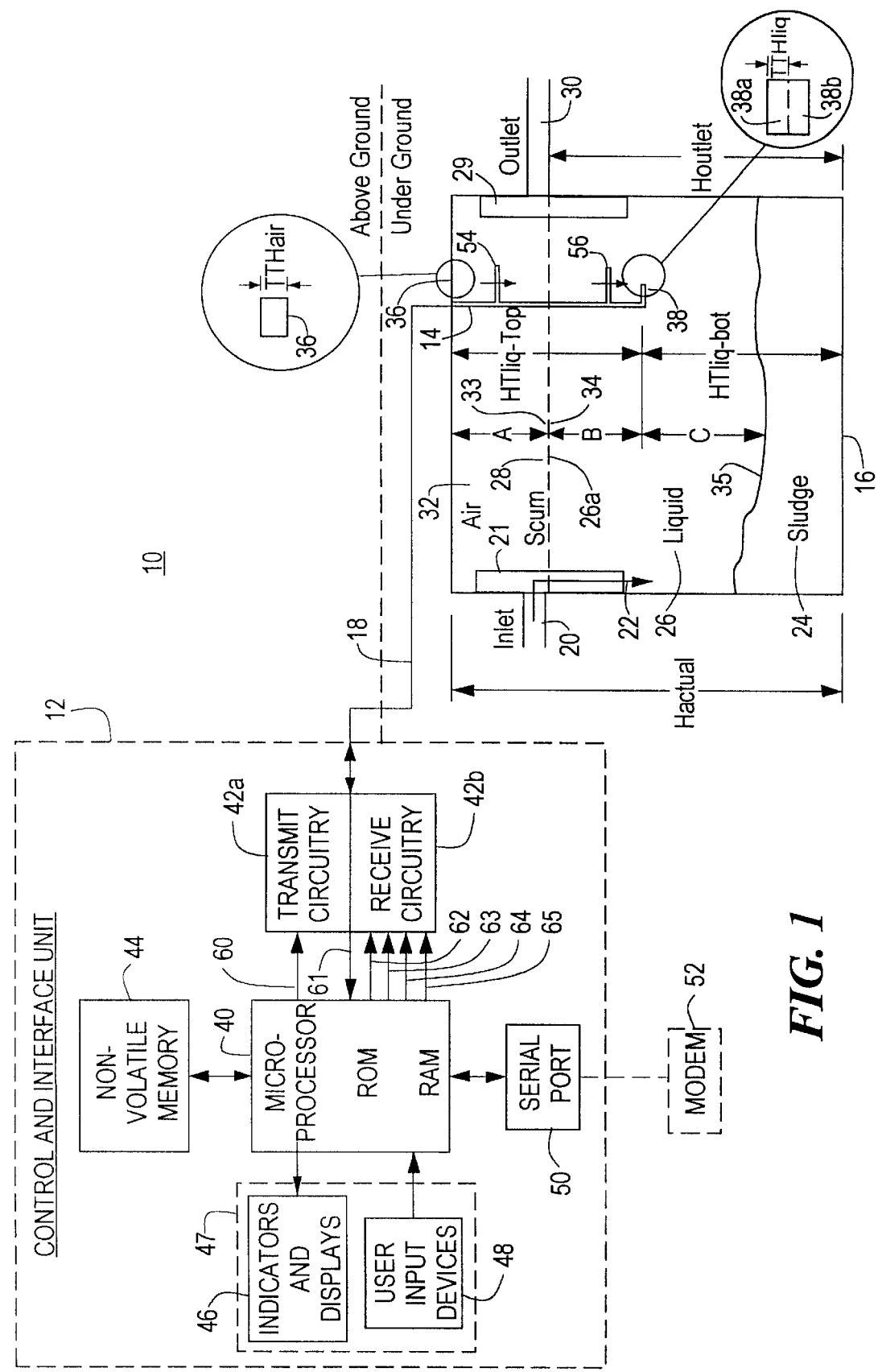
FIG. 1 is a schematic block diagram of the monitoring system for a separation reservoir according to this invention.

There is shown in FIG. 1 an automatic monitoring system 10 according to this invention for monitoring, among other things, both the upper and lower levels and the thickness of a floating medium in a separation reservoir. System 10 includes a control and interface unit 12 and transducer assembly 14 located within an underground separation reservoir 16 which is part of a waste water disposal system, such as, for example, a septic system or a greasetrap. Reservoir 16 acts as a separation reservoir by separating different mediums from the entering waste water, such as liquid, a scum layer floating on top of the liquid and a layer of sludge.

Control and interface unit 12 is interconnected to transducer assembly 14 by means of cables 18 which may be located at least partially underground. Reservoir 16 receives waste water entering from inlet 20 which includes a baffle 21 that directs the waste water in the direction of arrow 22 toward the bottom of reservoir 16. The entering waste water carries solids, a portion of which settle to the bottom of reservoir 16 and become sludge 24 and a portion of which float to the surface of liquid 26 forming a layer of scum 28. Liquid 26 flows through outlet baffle 29 and outlet pipe 30 where it is directed to a drainage field (not shown). The remainder of reservoir 16 is occupied by air and/or other gaseous material 32.

Over time, scum layer 28 accumulates and displaces a portion of the available volume in reservoir 16 creating less settling capacity for the incoming waste liquid. The result is that the scum layer encroaches on the upper and lower openings of baffle 29 and on outlet pipe 30. Also, as described in the Background of Invention, the proximity of floating solids in scum layer 28 to the outlet pipe 30 can be caused in other ways. And, as sludge 24 accumulates it decreases the setting capacity of the incoming waste liquid and it encroaches upon the opening of baffle 29 and outlet pipe 30. Therefore it is important to monitor the accumulation of scum layer 28 and the proximity of both its upper and lower boundaries to outlet pipe 30 as well as the accumulation of sludge 24 and its proximity to outlet pipe 30. If these boundaries reach predetermined levels, this indicates that reservoir 16 should be serviced.

In order to determine the levels and/or thicknesses of the various mediums within reservoir 16, i.e. sludge 24, liquid 26 and scum layer 28 the primary distances A, B and C (the distance from the top of reservoir 16 to the first medium interface, the distance from transducer unit 38 up to a medium interface, and the distance from transducer unit 38 down to a medium interface) and the levels of the interfaces between each different type of medium are first determined.

The first interface 33 is the interface between air or gaseous medium 32 and scum layer 28. This interface is the upper boundary of scum layer 28. The next interface 34, or lower scum layer boundary, is the interface between scum layer 28 and liquid 26 and the third interface 35 is between liquid 26 and sludge 24. It should be noted that the surface 26a of liquid 26 is not at interface 34. The liquid level 26a can, however, be calculated without directly measuring it from the measured levels of the top and bottom boundaries of scum layer 28, as described below. By determining the levels of these interfaces, the level of each medium and its thickness may be determined from known information about the geometry of reservoir 16 and the location of transducer assembly 14 in relation to reservoir 16. These calculations are described in detail below.

Transducer assembly 14 includes two transducer units 36 and 38 which transmit ultrasonic signals towards each interface and receive ultrasonic signals reflected from the interfaces. Although ultrasonic transducers are used in this embodiment they are only exemplary. The term transducer is used to generically refer to any type of device which converts electrical energy to mechanical energy and vice-versa. Transducer unit 36 located proximate the top of reservoir 16, in the air/gas region 32 is typically a 200 khz ceramic ultrasonic air transducer which emits a 200 khz ultrasonic detection signal that impinges upon interface 33. A portion of the 200 khz ultrasonic signal is reflected off interface 33 and received by transducer unit 36. Transducer unit 38, which is typically submerged in liquid 26, includes two 200 khz ceramic ultrasonic liquid transducers 38a and 38b. Transducer 38a directs a 200 khz ultrasonic detection signal toward interface 34 and receives a portion of that signal reflected off interface 34. Transducer 38b also transmits a 200 khz ultrasonic detection signal, however, in the opposite direction toward interface 35. A portion of that detection signal is reflected off interface 35 and received by transducer 38b. Transducer unit 38 may include a single transducer which is capable of generating both detection signals.

The detection signals output by transducer units 36 and 38 are generated by microprocessor 40 within control and interface unit 12 and conditioned within transmit circuitry 42a also within control and interface unit 12. The detection signals are transmitted over cable 18 to transducer units 36 and 38 and the reflected ultrasonic signals received by transducer units 36 and 38 are converted to electrical signals and are returned via cable 18 to receive circuitry 42b which passes the reflected signals to microprocessor 40. Microprocessor 40 computes the distances between each transducer unit and its associated interface and from that information computes the interface levels in relation to the depth of reservoir 16 and also the thicknesses of the different mediums to obtain status data regarding the condition of the reservoir. These calculations are described in detail below. This information is then stored in non-volatile memory 44, which may be a serial EEPROM, so that it will be retained even during a power loss. Other information such as site specific parameters and test data in addition to the above discussed status data are stored in non-volatile memory 44.

Display 46 of control panel 47 receives display signals from microprocessor 40 and displays information regarding certain reservoir parameters so that the condition of reservoir 16 can be easily monitored. Control panel 47 also includes an input device 48 which allows the user to enter data, parameters and commands, to display data, parameters and status via display 46 and to up-load and down-load data parameters, status, etc. via serial port 50. Serial port 50 may be used to up-load and down-load data to remote locations when used in conjunction with modem 52, shown in phantom.

Transducer assembly 14 also includes air test reference pole 54 and liquid test reference pole 56 which are mounted a predetermined distance, typically six inches, away from transducer units 36 and 38, respectively. These references are used to calculate the ultrasonic acoustic signal velocities through air and through liquid. For example, the approximate time for an ultrasonic acoustic signal to travel 12 inches (6 inches×2) at 20° C. would be 888 microseconds. Dividing this time by 12 inches results in an air velocity of 74 microseconds per inch. This same calculation is carried out for liquid velocity and these values are stored and used by microprocessor 40 to make the transducer unit to interface measurement calculations. In addition, microprocessor 40 compares the measured air velocity to 74 microseconds per inch, which is a standard air velocity for the expected temperatures of reservoir 16, to determine if significant amounts of other types of gases are present in region 32 and for other errors. Velocity fluctuations from changes in air temperature vary only ±5% over 60° C. Therefore, discrepancies greater than ±5% may indicate significant amounts of gases other than air in region 32. It should be noted that underground reservoirs such as reservoir 16, usually have a fairly constant temperature.

Figure 1A:
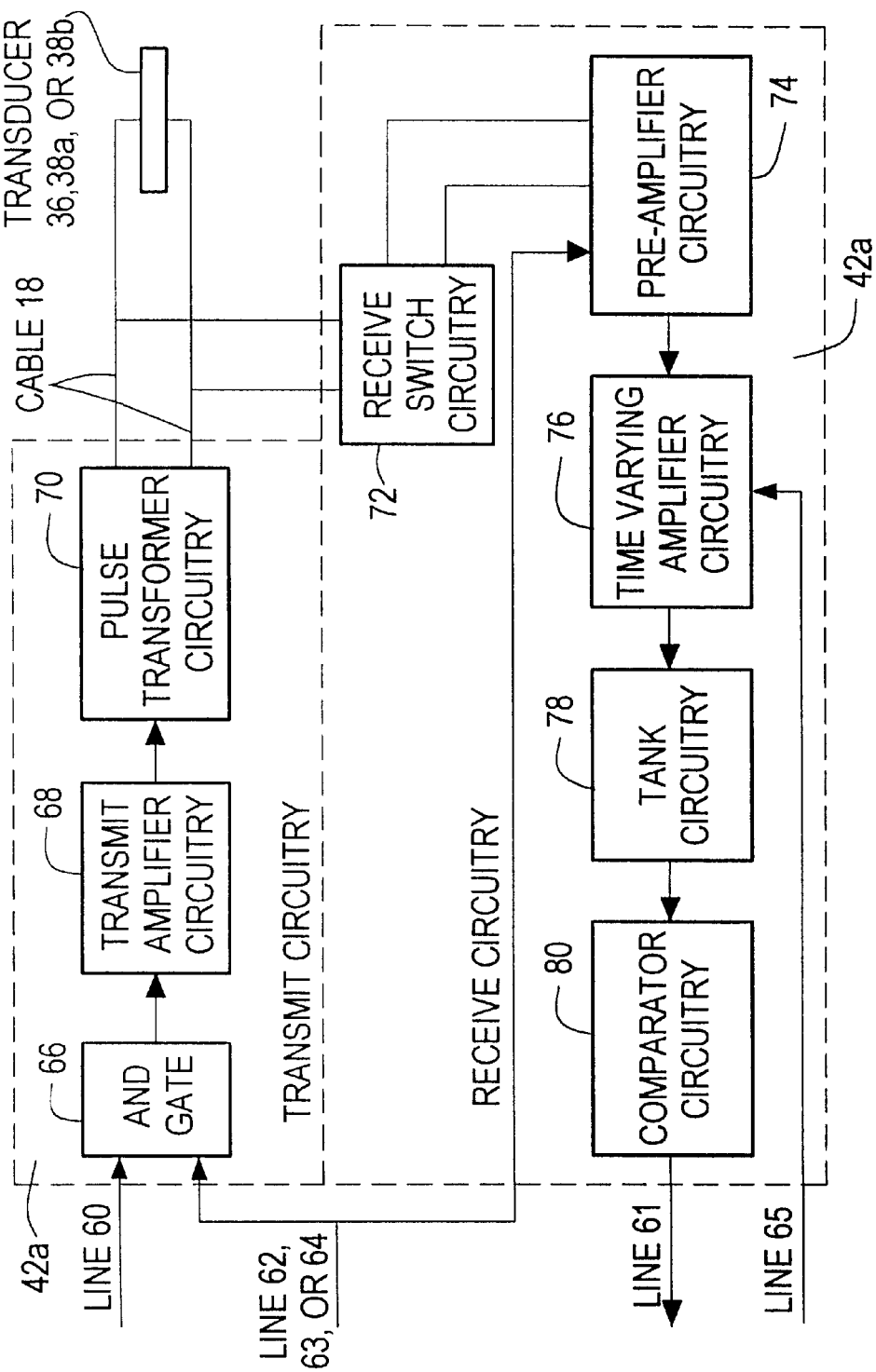
FIG. 1A is a schematic block diagram of the transmit/receive circuitry of FIG. 1.

Microprocessor 40 generates a series of pulses, typically eight (8), to transmit circuitry 42a over line 60. At the same time the pulses are generated on line 60, an enable line A, B or C ENABLE 62, 63 or 64 is also is asserted to select the transducer and associated transmit/receive circuitry being used for detection. The pulses on line 60 are ANDED with the asserted A, B or C ENABLE 62, 63 or 64 by AND gate 66, FIG. 1A, amplified in transmit amplifier circuitry 68, which, in turn drives pulse transformer circuitry 70. Pulse transformer circuitry 70 steps up the voltage of the pulses and provides impedance matching for transmitting the pulses over cable 18 to the transducer.

The reflected detection signals are then provided to receive circuitry 42b in control and interface unit 12 via cable 18 where the signals are capacitively coupled in receive switch circuitry 72 to back to back diodes, thereby limiting the maximum voltage provided to pre-amplifier 74. Pre-amplifier 74 provides a base level of gain. The time varying gain amplifier 76 provides additional gain over time to compensate for the increasing media attenuation of the signal over time. The time varying gain circuitry 76 is enabled and disabled by signals provided on TVG line 65 usually with the same timing as the signals on A, B and C ENABLE lines 62, 63 and 64. The amplified signal is then filtered in the tank circuitry 78 tuned to the specific frequency of the transmitted pulses on line 60. The comparator 80 circuitry includes a peak detector and a charge/discharge capacitor at the input by which incoming signals charge the capacitor and increase the voltage across it until its voltage exceeds the reference voltage, causing the comparator to assert its output on line 61, signaling to microprocessor 40 that an echo return has been received. The time periods between when the transmit signals are initiated by microprocessor 40 and the echo signals are received, are captured and stored by the microprocessor 40. As will be seen in detail below, this time interval is multiplied by the velocity of sound in the medium in which the signal traveled and divided by two to determine the distances, A, B and C from each transducer to each interface that generated an echo.

A, B and C ENABLE 62, 63 and 64 and TVG 65 stay asserted for the entire time the echoes are valid. In the case of an empty tank, the air transducer 36 enable timing, A ENABLE 62, would be at least 74 us/inch * 2 * Hactual (in microseconds) after the transmit pulses on line 60 were initiated. Similarly, in the case of a reservoir filled to the top with liquid, the B ENABLE timing for the liquid transducer 38*a* would extend for at least 17 us/inch * 2 * HTliq-top (in microseconds). For liquid transducer 38*b*, the C ENABLE timing would extend for at least 17 us/inch * 2 * HTliq-bot (in microseconds).

Each transducer 36, 38*a* and 38*b* has similar dedicated transmit/receive circuitry with minor component variations due to signal strength requirements or frequency and loading requirements of the transducer and cabling. Although not shown, circuit reduction through combining redundant functions is possible.

A program memory located within microprocessor 40 contains the operating software that runs system 10. Microprocessor 40 executes the software located in program memory, controls display 46, input device 48 and serial port 50 as well as transmit and receive circuitry 42*a* and 42*b*. Microprocessor 40 also provides timing, scheduling, math and logic functions and stores and downloads data, parameters and status to and from non-volatile memory 44 and serial port 50.

System 10 keeps track of time in two ways, relative and absolute. Relative time is maintained in terms of 60 minute periods (hours), 25 hour periods (days), 25 day periods (months), and 14 month periods (years). A time clock, within microprocessor 40, starts after an installation initialization is completed. The most recent hour, day, month, and year are kept in non-volatile memory 44. In the event of power failure, a status register within microprocessor 40 causes the time to be reset. Also, after power has been restored, system 10 performs ultrasonic testing and the results are then compared with the most recent previous calculations of A+B+C. If no appreciable change is detected (±2%), then it is assumed that no appreciable time has been lost. If greater than 2% change is detected it is assumed that appreciable time has been lost. With regard to the absolute time, the current hour, month, day and year are entered and a back-up battery is used to keep the clock function operational in the event of a power failure.

Non-volatile memory 44 stores the results of test measurements A, B and C and the information in the status register and highs and lows for each period of time are kept. As data ages, the periods of time become greater. Data storage periods are broken down as follows: each day for the most recent month; each month for most recent 24 months; each three months for the most recent 3 to 7 years; and each year for the most recent 8–20 years.

The three primary distances calculated by system 10 from the transducer measurements are distance A from the inside top of reservoir 16 to interface 33 (or the surface 26*a* of liquid 26 if no scum layer is present), distance B from the center of liquid transducers 38*a* and 38*b* to interface 34 (or the surface 26*a* of liquid 26 if no scum layer is present), and distance C from the center of liquid transducers 38*a* and 38*b* to interface 35 (or the bottom of reservoir 16 if no sludge is present).

Distances calculated from the transducer echo measurements are used in conjunction with reservoir geometries, such as Hactual, the height of reservoir 16, Houtlet, the distance from outlet 30 to the bottom of reservoir 16, the transducer assembly 14 length, HTliq-top, and the air and liquid transducer thicknesses TTHair and TTHliq to derive distances A, B & C. These three distances combined with default reservoir related parameters and conditions, site specific parameters and previous measurements are used to calculate the conditions of the different mediums within reservoir 16 and associated service requirements.

Figure 2F:
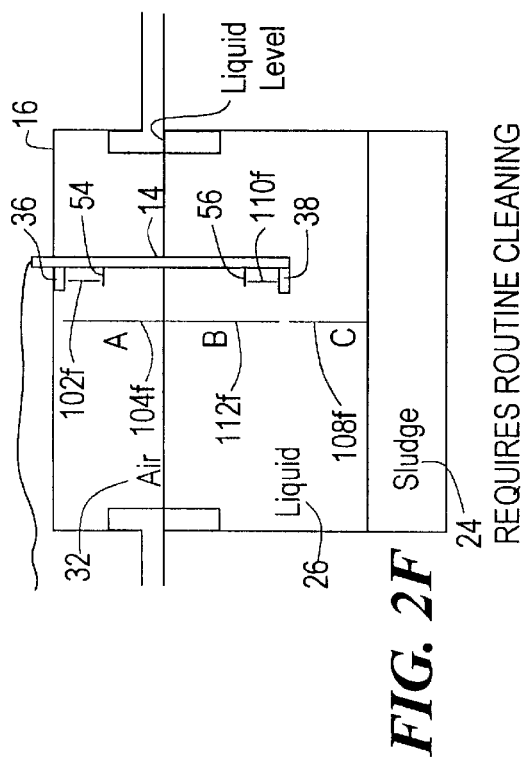
Figure 2H:
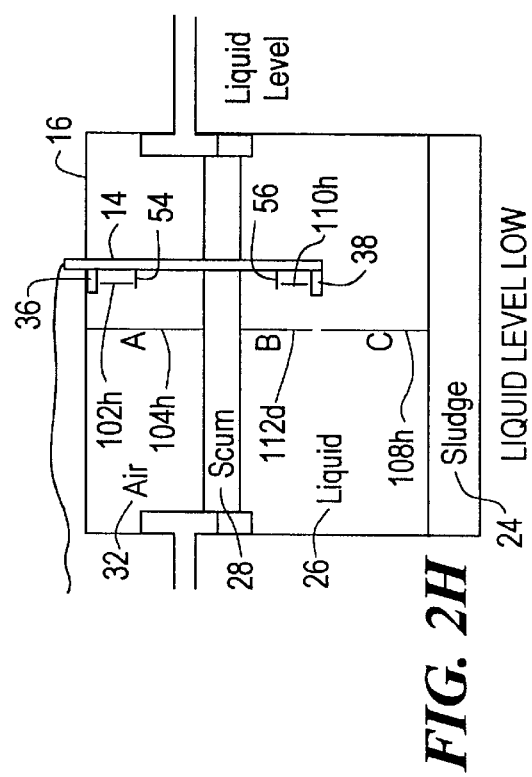

A cross-section of reservoir 16 in eight (8) possible states or conditions is illustrated in FIGS. 2A–2H. Also, eight (8) sets of air and liquid transducer echo timing diagrams which correspond to each state shown in FIGS. 2A–2H are illustrated in FIGS. 3A–3H. A new, or recently cleaned, empty reservoir 16 is illustrated in FIG. 2A with distance A encompassing the entire inside height, Hactual, of reservoir 16. FIG. 3A illustrates the 8-pulse 200 khz transmit signal, XMIT 100*a*, generated by microprocessor 40, FIG. 1, followed by two air echo returns. The first echo return, Echoair1 102*a*, is from air test reference 54, 6 inches away from air transducer 36. The second echo return, Echoair2 104*a*, is from liquid transducer 38. After calculating distance A using the second echo return, Echoair2, 104*a*, a comparison to HTliq-top identifies that Echoair2, 104*a*, coming from the liquid transducer 38, indicating the scum or liquid interface, is at or below liquid transducer 38. FIG. 3A illustrates that there are no echo returns from liquid transducers 38 as they are not designed to operate in air.

Figure 3A:
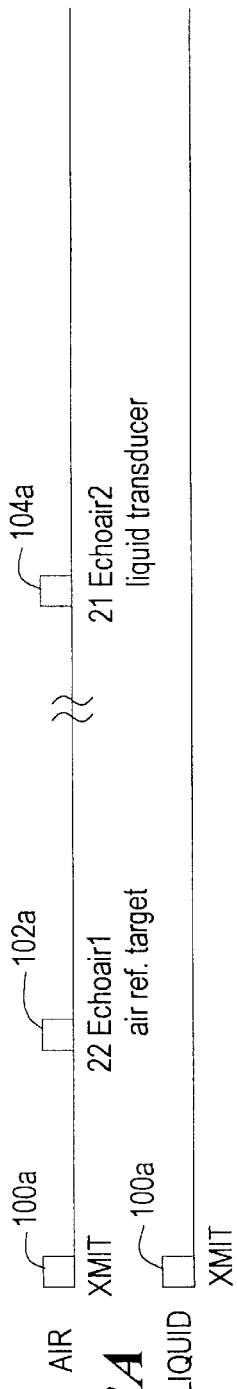
Figure 3B:
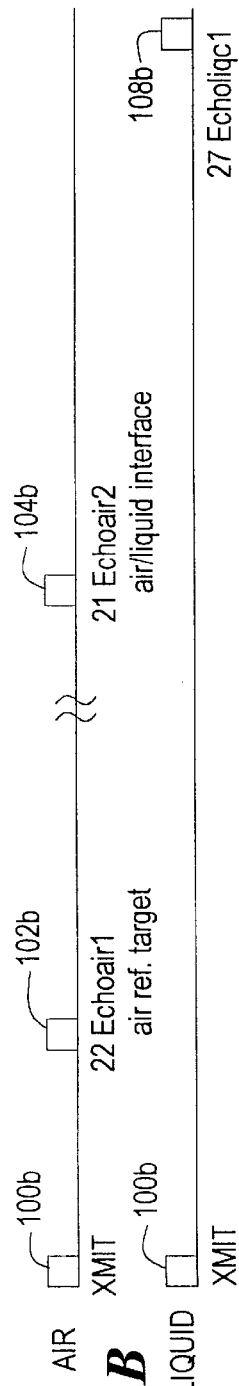

FIG. 2B depicts reservoir 16 as it is being filled. FIG. 3B illustrates that Echoair2 104*b* is received slightly ahead in time of Echoair2 104*a*, FIG. 3A, indicating that a reflecting interface above liquid transducers 38 has been encountered. Echoair1 102*b* occurs at the same time that Echoair 102*a* occurred as both are caused by air test reference 54. Echoair2 104*b* is the last air echo received and is therefore used to calculate distance A, which in this case is less than the distance to liquid transducers 38. The calculated distance A is also closer to liquid transducer 38 than the six inch minimum distance required for liquid transducer 38*a* to operate. This is verified, in that there is no echo return from transducer 38*a* which outputs a signal directed up toward the top of reservoir 16. However, there is an echo, Echoliqc1 108*b*, that is used to calculate distance C.

Figure 3C:
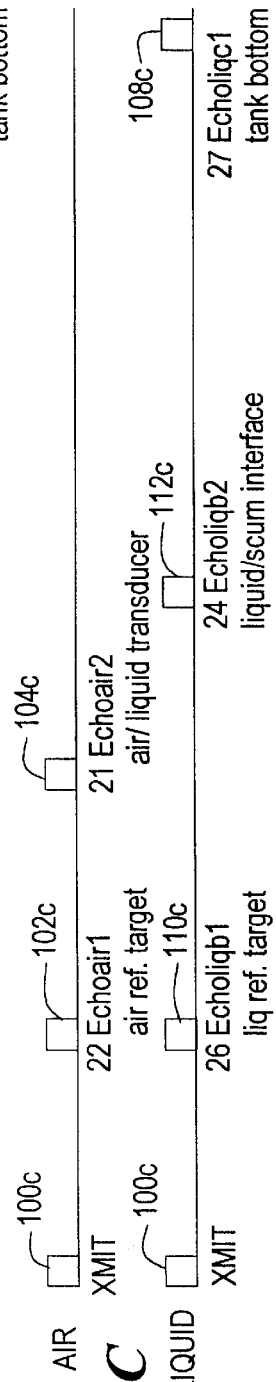

Reservoir 16, FIG. 2C, is filled with liquid to the proper level equivalent to Houtlet. The timing diagrams of FIG. 3C illustrate that all three transducers are operational. Both Echoair1 102*c* and Echoliqb1 110*c* echoes from air reference 54 and liquid reference 56, respectively, are received. Also, Echoair2 104*c*, Echoliqb2 112*c* and Echoliqc1 108*c* are received. Distance calculations A and B meet at the level of the outlet, Houtlet, indicating that no scum layer has yet formed and that the liquid level is normal. And, distance C calculated from Echoliqc1 108*c* indicates that the bottom is still free of sludge.

Figure 3D:

Reservoir 16, FIG. 2D, shows that scum and sludge layers have formed. Reference target echoes, Echoair1 102*d* and Echoliqb1 110*d*, FIG. 3D, are virtually unchanged from FIG. 3c, while echoes, Echoair2 104*d*, Echoliqb2 112*d* and Echoliqc1 108*d* are all shorter than their counterparts in FIG. 3C. This indicates that distances A, B & C have also become shorter and that both the scum and sludge layers are present. The liquid level is still at the same level, Houtlet.

Figure 2E:
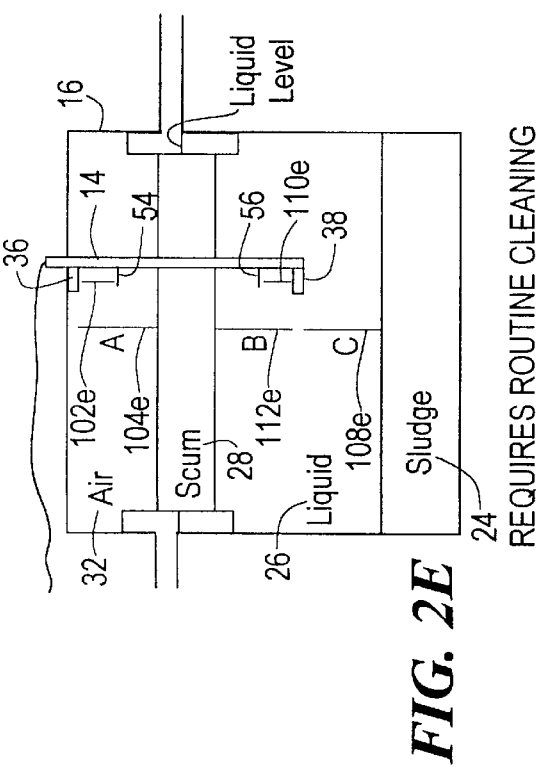

Reservoir 16, FIG. 2E, depicts a reservoir that requires routine cleaning either because the scum and sludge have exceeded the total allowable solid level or because one or more of the upper scum level, lower scum level or the sludge level have exceeded their predefined limits. FIG. 3E illustrates that Echoair2 104e, Echoliqb2 112e and Echoliqc1 108e have all become shorter than their counterparts in FIG. 3D. As well, distances A, B & C have all become shorter indicating that the scum and sludge levels have increased. The liquid level is still the same at the outlet level, Houtlet.

Reservoir 16, FIG. 2F, depicts a reservoir that requires routine cleaning even though no scum layer is present, because either the total allowable solids composed of just the sludge volume, or the sludge level has been exceeded. In FIG. 3F, Echoair1 102f, Echoair2 104f, Echoliqb1 110f and Echoliqb2 112f and their corresponding distances A and B are virtually identical to those of FIG. 4C. The liquid level is still at the same level, Houtlet.

Figure 2G:
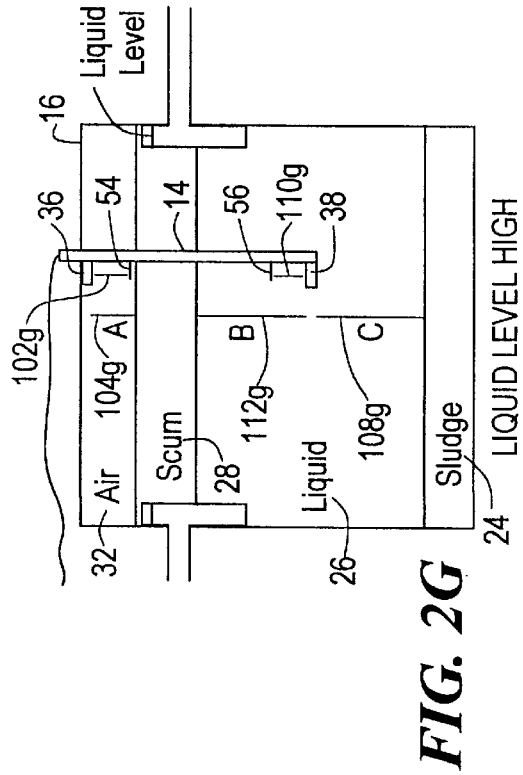

Reservoir 16, FIG. 2G, depicts a reservoir with either the maximum liquid level or scum level or both exceeded. Echoair2 104g, FIG. 3G, is very close to Echoair1 102g. If the liquid level continues to rise, distance A would eventually be equal to the air test reference distance and Echoair1 102g would have approximately the same timing as Echoair2 104g. By delaying the time variable gain of receive circuitry 42b, FIG. 1, via microprocessor 40 by the TVG signal line 65, receive circuitry 42b has a very minimal gain at the time the echo from air test reference 54 is received. At this minimal gain, the echo from air test reference 54 will not be detected by receive circuitry 42b and only the stronger signal reflecting from the surface of the scum layer or liquid will be detected. A further rise in the liquid level will bring the scum layer closer than the minimum six (6) inch distance to air transducer 36 until no valid air echoes are received. As distance A and its corresponding Echoair2 104g become shorter, distance B and its corresponding Echoliqb2 112g becomes proportionally larger until distance B, plus the height of the scum equals the entire distance from the liquid transducers 38 to the inside top of reservoir 16 and the scum layer reaches the top inside of the reservoir 16. By using distance B and the most recent previous valid calculation for the height of the scum layer, an estimated value of A can be calculated.

Reservoir 16, FIG. 2H, has either its liquid level, its scum level or both exceeding their predefined levels. Echoliqb2 112h, FIG. 3H, is very close to Echoliqb1 110h indicating that the bottom of the scum layer is very close to liquid transducer test reference 56. If the liquid level continued to fall, distance B would equal the liquid test reference 56 distance and Echoliqb1 110h would have approximately the same timing as Echoliqb2 112h. By delaying the time variable gain of receive circuitry 42b, FIG. 1, via microprocessor 40, by the TVG signal line 65, receive circuitry 42b will have very minimal gain at the time the echo from liquid test reference 56 is received. At minimal gain, the echo from liquid test reference 56 will not be detected by receive circuitry 42b and only the stronger signal reflecting from the bottom of the scum layer or liquid will be detected. A further fall in the liquid level will bring the scum layer closer to the minimum six (6) inch distance required for liquid transducer 38 to operate properly and Echoliqb1 110h would not be received. An even further fall in the liquid level would drop the liquid below the liquid transducers 38 until Echoliqc1 108h is not received. As distance B and its corresponding Echoliqb2 112h becomes shorter and disappears, distance A and its corresponding Echoair2 104h becomes proportionally larger. A further drop in the liquid level causes distance C to become shorter and its corresponding Echoliqc1 to disappear. At the same time distance A and its corresponding Echoair2 104h become proportionally larger still until all the liquid has leaked out and distance A plus the height of the scum layer and the height of the sludge equal the entire inside height of the reservoir, Hactual. By using distance A and the most recent previous valid calculation for the height of the scum layer, an estimated value of B can be calculated. Note that a negative value for B indicates that the liquid level has gone below the liquid transducers 38 and has encroached on distance C in which case distance C could be calculated using the most recent previous value calculation for the height of the sludge.

Figure 4:
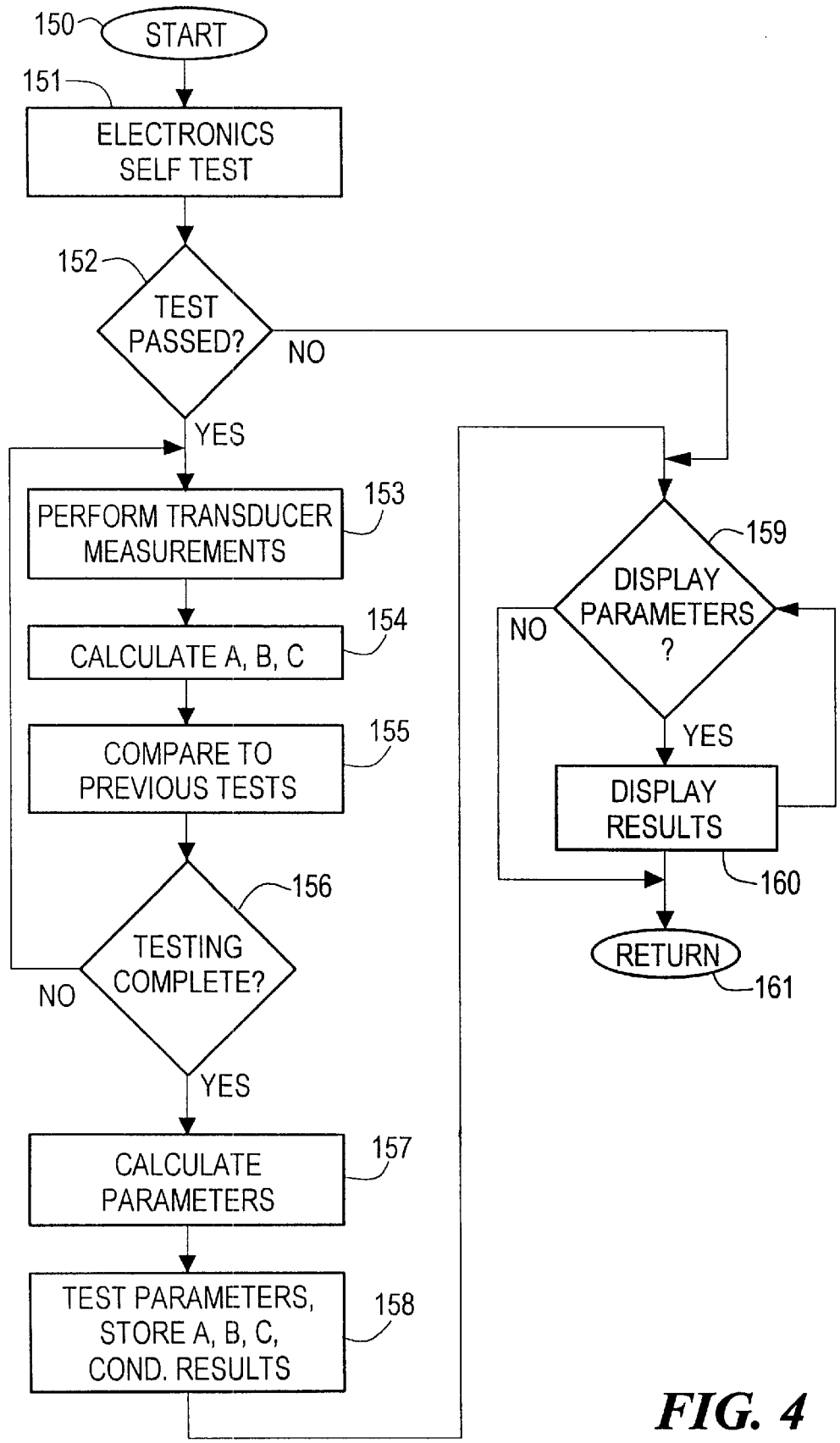
FIG. 4 is a flow chart of the main software routine in microprocessor 40, FIG. 1.
Figure 5A:
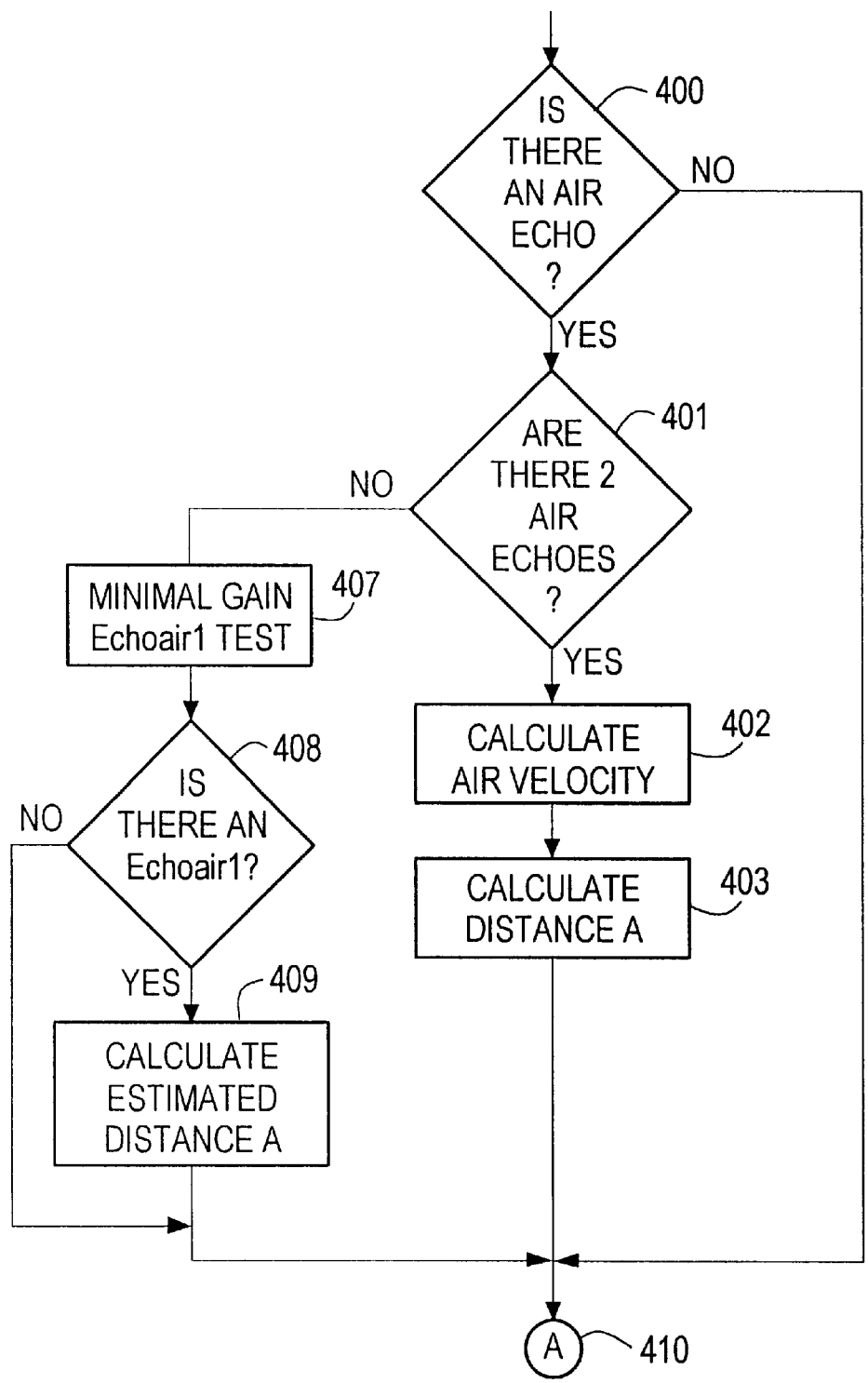
FIG. 5A is a flow chart of the software sub-routine for calculating distance A in the reservoir.
Figure 5B:
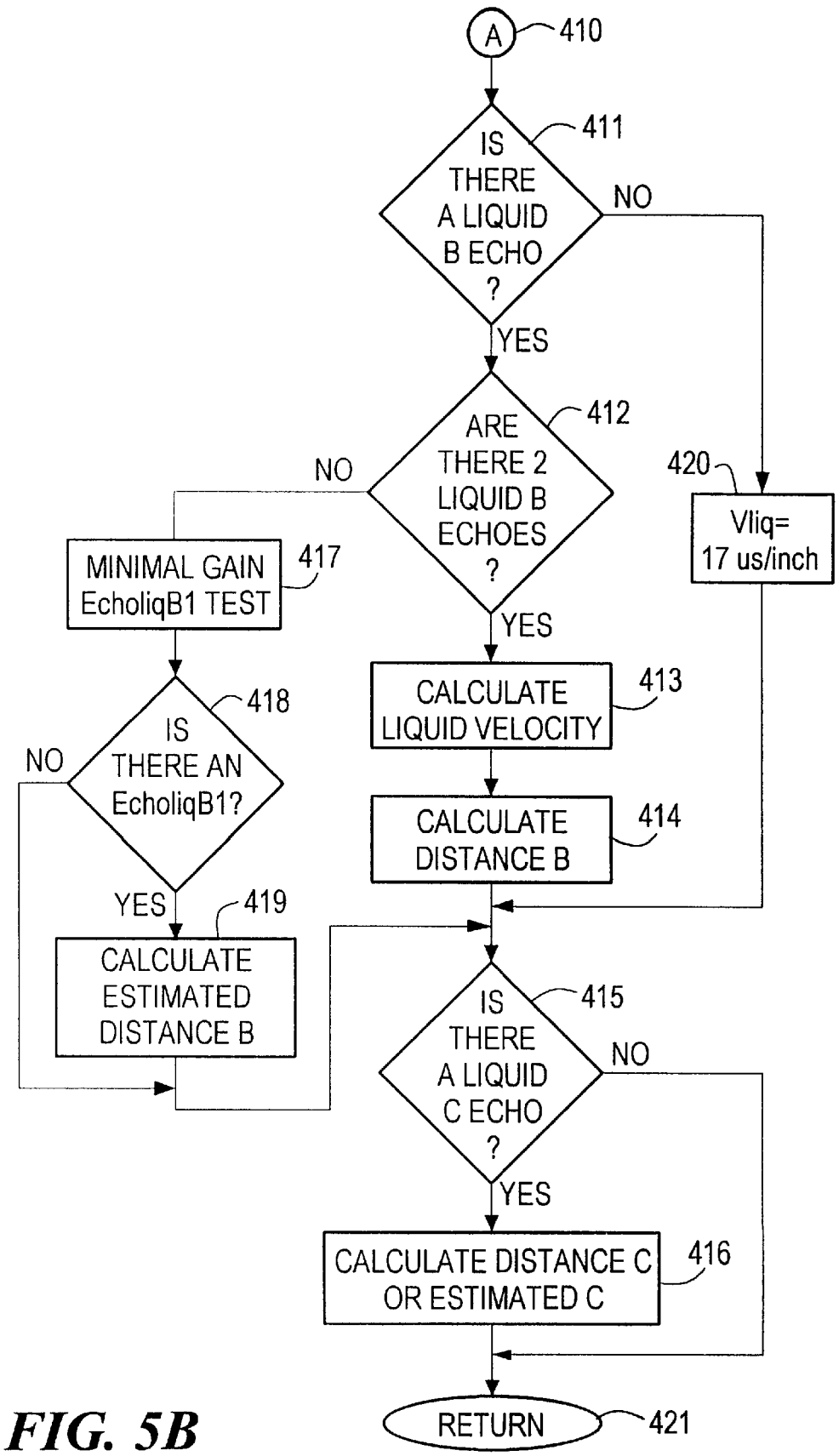
FIG. 5B is a flow chart of the software sub-routine for calculating distances B & C in the reservoir.

The software for system 10, FIG. 1, is described with regard to the flow charts depicted in FIGS. 4, 5A and 5B. In FIG. 4 the flow chart for the main software routine is depicted. Transducer testing is initialized at step 150 either automatically by microprocessor 40, FIG. 1, at pre-defined time intervals, after a power-up sequence, or manually when prompted by the user via input device 48 or serial port 50, FIG. 1. Upon receiving a transducer measurement request, microprocessor 40 initiates a digital electronics self-test at step 151. The ROM in microprocessor 40 is read and check sum verified followed by the RAM and non-volatile memory 44. If it is determined at step 152 that the system has failed the digital electronics self-test, an electronic self-test error message is displayed at step 159. If the electronics self-test is determined to be successful at step 152, the program proceeds to perform transducer measurements at step 153 which consist of microprocessor 40 initiating a transmit signal and timing the periods for the return of the echo signals. The time periods between transmission of the signals and the return of the echo signals for both air transducer 36 and liquid transducers 38 are stored in microprocessor 40. Air echo returns are labeled sequentially in the order of their return, namely, Echoair1 and Echoair2. Similarly, the liquid echo returns are labeled in the order of their return, namely, Echoliqb1, Echoliqb2 and Echoliqc1. In step 154 distances A, B and C are calculated. The flow chart for the subroutine for calculating distance A is shown in FIG. 5A and the flow chart for the subroutine for calculating distances B and C is shown in FIG. 5B. Both flow charts are described in detail below. Using the appropriate transducer assembly constants of Table 1 which are stored when system 10 is installed as described below with regard to FIG. 6 and equations of Table 2, distances A, B and C are calculated.

TABLE 1

Transducer Assembly Constants

| | |
|---|---|
| HTliq-top: | distance from center between liquid transducers (Tliq) to inside top of reservoir |
| TTHair: | distance from air transducer to top inside of reservoir |
| TTHliq: | distance from each liquid transducer to center between liquid transducers |

TABLE 2

Equations

| | |
|---|---|
| Vair | = Echoair1 ÷ 12 (us/inch), *74us/inch     (air velocity) |
| Vliq | = Echoliqb1 ÷ 12 (us/inch), *17us/inch     (liquid velocity) |
| A | = ((Echoair2 * Vair) ÷ 2) + TTHair, *((Echoair1 * Vair) ÷ 2) + TTHair |
| B | = ((Echoliqb2 * Vliq) ÷ 2 + TTHliq, * ((Echoliqb1 * Vliq) ÷ 2) + TTHliq |
| C | = ((Echoliqc1 * Vliq) ÷ 2) + TTHliq |

Notes: *Single echo return

At step 155 calculated distances A, B and C are compared to the previous day's measurements $A_p$, $B_p$ and $C_p$. At step 156 it is determined if the difference between the previous day's measurements and the present day's measurements are within 2% of one another. If they are then transducer testing is complete and the program proceeds to the parameter calculations at step 157. If the difference is greater than 2%, then the system loops back to step 153 where an additional set of transducer measurements are taken and, distances A, B and C are again calculated and compared to the previous day's results. The transducer measurements closest to $A_p$, $B_p$ and $C_p$ are used for the balance of the program. If the distances are not close, this will be noted in the status register and may also affect parameter testing.

Figure 6:
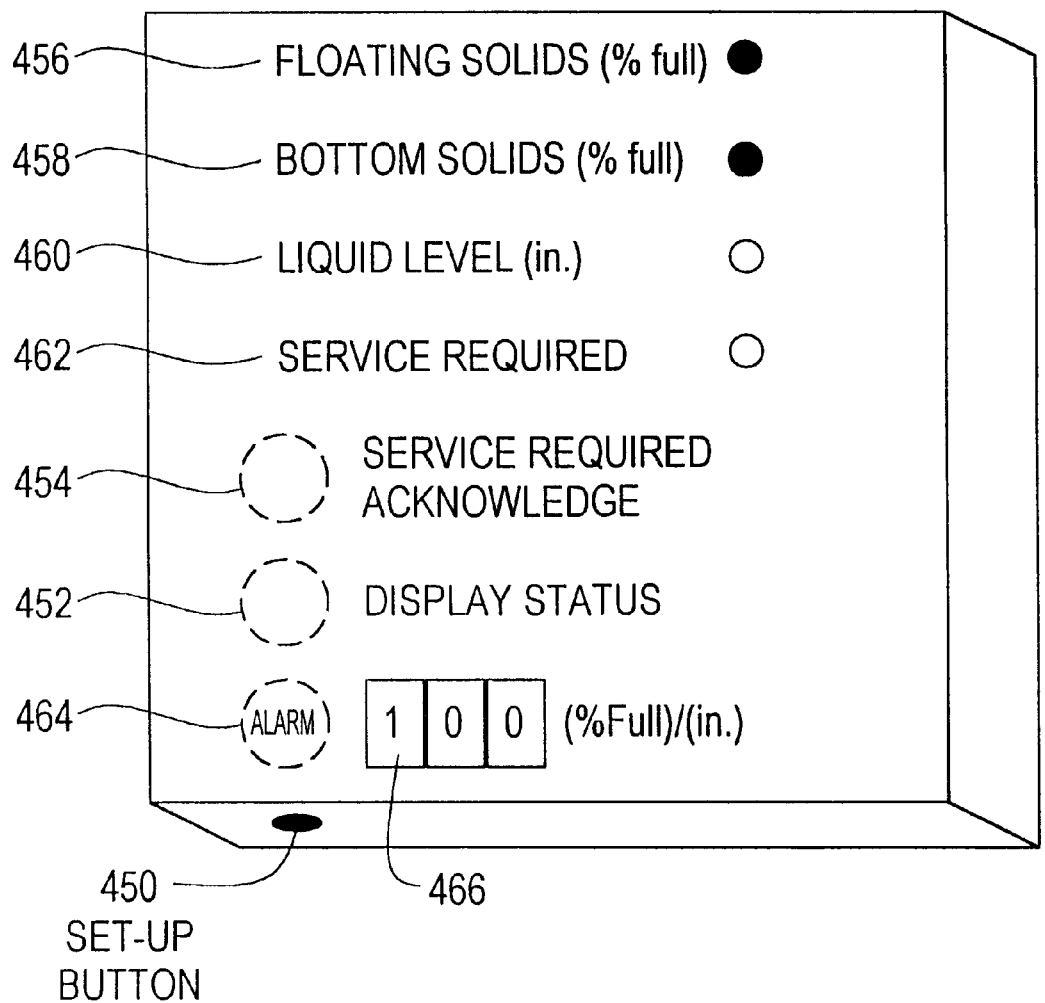
FIG. 6 is a perspective view of control panel 47 of FIG. 1.

In step 157 the system parameters of Table 3 below are calculated using distances A, B and C, the appropriate transducer assembly constants of Table 1 and the set-up constants (established when system 10 is installed as described below with regard to FIG. 6.) of Table 4 below.

liquid 26 and then dividing by Houtlet, the normal maximum liquid level height within reservoir 16. This gives the ratio of scum compared to the rated liquid capacity of reservoir 16. Multiplying by 100 converts the ratio to a percentage. Percent sludge, Psludge, is calculated by dividing Hsludge by Houtlet for the ratio of sludge compared to the rated liquid capacity of reservoir 16. Again, multiplying by 100 converts this ratio to a percentage. Psolids-full is the percent full of total solids as compared to the rated liquid capacity of reservoir 16 and is calculated by simply adding Pscum and Psludge together. Pscum-dis is the ratio of percentage scum, Pscum, divided by PsolidsS, the percentage of total allowable solids. Psludge-dis is the ratio of percentage sludge, Psludge, divided by the percent of total allowable solids, PsolidsS. Psolids-dis is the ratio of percentage total solids, Psolids-full, divided by the percentage of total allowable solids, PsolidsS. The liquid level, Liq-lev-dis, is cal-

TABLE 3

Parameter Equations

| | | |
|---|---|---|
| HTliq-bot | = Hactual − HTliq-top | |
| Hscum | = HTliq-top − A − B (inches) | (scum thichness) |
| Hsludge | = HTliq-bot − C (inches) | (sludge thickness) and Bottom Solids High Calculation |
| Pscum | = (Hscum * .73)/Houtlet * 100 | (percent scum full) |
| Psludge | = Hsludge/Houtlet* 100 | (percent sludge full) |
| Psolids-full | = Pscum + Psludge | (percent solids full) |
| Pscum-dia | = Pscum/PsolidsS | Flosaing Solids (as a percent of allowable solids) Calculation |
| Psludge-dis | = Psludge/PsolidsS | Bottom Solids (as a percent of allowable solids) Calculations |
| Psolids-dis | = Psolids-full/PsolidsS | Total Solids (aa a percent of allowable solids) Calculation |
| liq-level-dis | = HTliq-bot + B + (Hscum * .73) − Houtlet | Liquid Level Calculation |
| scumH-calc | = HTliq-bot + B + Hscum − Houtlet | Floating Solids High Calculation |
| scumL-calc | = HTliq-bot + B − Houtlet | Floating Solids Low Calculation |

TABLE 4

Set-up Constants

| | | |
|---|---|---|
| Hactual: | Inside Tank Height | |
| Houtlet: | Tank Bottom to Outlet (tank liquid level) | |
| PsolidsS: | Solids as a Percent of Tank Capacity | (Service Required) |
| scumH: | Floating Solids Level High (inches) | (Service Required) |
| scumL: | Floating Solids Level Low (inches) | (Service Required) |
| liqH: | Liquid Level High (inches) | (Service Required) |
| liqL: | Liquid Level Low (inches) | (Service Required) |
| sludgeH: | Bottom Solids High (inches) | (Service Required) |
| Alarm | Alarm ON/OFF | |

The parameters calculated in step 157 are the following: HTliq-bot (height from the bottom of reservoir to the liquid transducer unit) Hscum (scum thickness), Hsludge (sludge thickness), Pscum (percent scum full), Psludge (percent sludge full), Psolids-full (percent solids full), Pscum-dis (floating solids as a percent of allowable solids), Psludge-dis (bottom solids as a percent of allowable solids), Psolids-dis (total solids as a percent of allowable solids), liq-level-dis (liquid level), scumH-calc (upper boundary of scum layer) and scumL-calc (lower boundary of scum layer).

The distance from the liquid transducers 38 to the bottom of reservoir 16, Htliq-bot, is calculated by subtracting the distance from the top of reservoir 16 to liquid transducers 38 from the height of the reservoir, Hactual. The scum thickness, Hscum is calculated by subtracting distances A and B from HTliq-top. Hsludge, the sludge thickness, is calculated by subtracting distance C from HTliq-bot. Pscum is the percentage of scum 28 displacing liquid 26 and is calculated by first multiplying Hscum by 0.73, the buoyancy of scum, to derive the actual amount of scum 28 displacing culated by subtracting the normal liquid level of the tank, Houtlet, from the combined distances of HTliq-bot, the distance from the bottom of the septic tank to the liquid transducers and the distance of the scum up to the liquid level using the buoyancy of scum, Hscum multiplied by 0.73. High floating solids, scumH-calc, is calculated similarly to Liq-lev-dis, but the total height of the scum, Hscum, is used with the result representing the distance which the top of scum 28 is located from the normal liquid level of the septic tank, Houtlet. Low floating solids, scumL-calc, is calculated similarly to scumH-calc but without adding scum thickness, Hscum, resulting in the distance from the bottom of the scum 28 to the normal liquid level of the septic tank, Houtlet.

It should be noted that the liquid level could be directly measured by the air or liquid transducer if it is positioned to monitor both the top of the scum and the liquid level 26a, or the bottom of the scum and the liquid level 26a in baffle 29. Or, two separate air or liquid transducers can be used, one to monitor the scum and another to monitor the liquid level. These alternate configurations are depicted in FIGS. 7A and 7B, described below.

At step 158 the calculated parameters and distances A, B and C are conditionally tested and distances A, B and C and the conditional test results are stored. It should be noted that all parameters can be re-created with stored previously determined distances A, B and C by using the transducer assembly constants of Table 1, set-up constants of Table 4 and parameter equations of Table 3. The exception parameters testing of Table 5, is used to identify basic state changes in reservoir 16 and to test for potential transducer and electronic errors.

TABLE 5

Exception Parameters Testing

| | |
|---|---|
| 200 NoReadings | A, B, & C missing. Cable not connected properly, electronics problem, improper installation. Error Code 322 ERR. |
| 210 AOnly | B & C missing |
| 212 A > HTliq-top | Liquid level too low for liquid transducers. Display Status Exception 2 310, LO–. |
| 213 A ≥ HTliq-top -Hscumpv* | Scum/liquid level may be too low for liquid transducers to operate. |
| 214 A ≥ HTliq-top -Hscump** | Display Status Exception 2, 310, LO–, LO?. |
| 215 A < HTliq-top -Hscumpv* | Liquid transducers or associated electronics may not be |
| 216 A < HTliq-top -Hscump** | working. Error Code 323 LTE, 324 LT?. |
| 220 BOnly | A & C missing |
| 221 B ≥ HTliq-top -6" | Liquid level/scum level too close for air transducer. Liquid-down transducer or associated electronics may not be working. Error Code 325 HCE. |
| 222 B ≥ HTliq-top – (6" + Hscumpv*) | Liquid level/scum level may be to close for air transducer, |
| 223 B ≥ HTliq-top – (6" + Hscump**) | liquid-down transducer or associated electronics may not be working. Error Code 325 HCE or 326 HC?. |
| 224 B ≤ HTliq-top – (6" + Hscumpv*) | Air and Liquid-down transducer or associated electronics may not |
| 225 B ≤ HTliq-top – (6" + Hscump**) | working. Error Code 327 ACE or 328 AC?. |
| 230 COnly | A & B missing. Air and/or Liquid-up tranducer or associated electronics may not be working. Error Code 329 ABE. |
| 240 AandBOnly | C missing |
| 241 Cpv* > 6" | Liquid-down transducer or associated electronics may not be working. Error Code 330 LCE. |
| 242 Cpv* ≈ 6" or Cpv* ≤ 6 | Sludge level too high. (Representing gross negelect) Error Code 331 HSE. |
| 243 Cpv* not available | Error code 332 HS?. |
| 250 AandCOnly | B missing |
| 251 HTliq-top – A – Hscumpv* > 6" | Liquid-up transducer or associated electronics may not be |
| 252 HTliq-top – A – Hscump** > 6" | working. Error Codes 333 LBE or 334 LB? |
| 253 HTliq-top – A – Hscumpv* ≤ 6" | Scum/Liquid level. May be too low. |
| 254 HTliq-top – A – Hscump** ≤ 6" | Display Status Exception 2, 310, LO–, LO?. |
| 260 BandCOnly | A missing |
| 261 B ≥ HTliq-top – 6" | Scum/Liquid level too high for air transducer to work. Error Code 335 HAE. |
| 262 B ≥ HTliq-top – HTscumpv* – 6" | Liquid level may be too high for air transducer to work. |
| 263 B ≥ HTliq-top – Hscump** – 6" | Error Code 335 HAE or 336 HA? |
| 264 B < HTliq-top – Hscumpv* – 6" | Air transducer or associated electronics may not be working. |
| 265 B < HTliq-top – Hscump** – 6" | Error Code 337 ATE or 338 AT?. |
| 270 A,B,andC | |
| 271 A + B + C = Hactual | Septic Tank recently cleaned. Display status exception 1 300. |
| 272 A + B + C < Hactual | Solids have accumulated. |
| 273 A + B + C + Hsludge + Hscum ≠ Hactual | Sum total does not add up correctly. Error code 341 ADE. |

*Parameter: ending in pv (previous valid) are derived from most recent previous day's parameters and the system has not been powered down.
**Parameter ending in p (previous) are derived from most recent previous day's parameters and the system has been powered down.

Except for when the septic tank is emptied as a result of a cleaning, during normal operations the distances A, B, and C, should be detectecd. Lack of one or more of these primary distance is therefore the first step in identifying exceptions to normal reservoir operations. Exception conditions detected are reported to the user as shown in Display Results Exceptions and Error Codes Table 6 below.

TABLE 6

Display Results Exceptions and Error Codes

300 Display Status Exception 1 (Tank recently cleaned)

| Parameter | Segment Displays Reading |
|---|---|
| Pscum-dis - | CLE |
| Psludge-dis = | CLE |
| Psolids-dis = | CLE |
| liq level -dis = | ### Where ### = calculated liquid level. A, B and C 271 |

TABLE 6-continued

Display Results Exceptions and Error Codes

310 Display Status Exception 2

| Parameter | Segment Displays Reading |
|---|---|
| Pscum-dis = | — |
| Psludge-dis = | — |
| Psolids-dis = | — |
| liq level -dis = | LO- A Only 212, 213, LO?, 214 and A + C Only LO-, 253, LO?, 254. |

320 Error Codes

| Segment Displays | Error Description |
|---|---|
| 321 STE | Self Test failure Error. |
| 322 ERR | No Readings 200. |
| 323 LTE | Liquid Transducers related Error. A Only 215. |
| 324 LT? | Liquid Transducers related Error. A Only 216. |
| 325 HCE | Liquid Level High, Liquid-down Transducer related Error. B Only 221, 222. |
| 326 HC? | Liquid Level High, Liquid-down Transducer related Error. B Only 223. |
| 327 ACE | Air and Liquid-down Transducer related Error. B Only 224. |
| 328 AC? | Air and Liquid-down Transducer related Error. B Only 225. |
| 329 ABE | Air and Liquid-up Transducer related Error. C Only 230. |
| 330 LCE | Liquid-down Transducer related Error. A and B Only 241. |
| 331 HSE | High sludge level, Liquid Transducer-down cannot work. A and B Only 242. |
| 332 HS? | Liquid-down Transducer cannot work. A and B Only 243. |
| 333 LBE | Liquid-up Transducer related Error. A and C only 251. |
| 334 LB? | Liquid-up Transducer related Error. A and C only 252. |
| 335 HAE | Liquid/Scum Level too high for Air Transducer to operate. B and C Only 261, 262. |
| 336 HA? | Liquid/Scum Level too high for Air Transducer to operate. B and C Only 263. |
| 337 ATE | Air Transducer related Error. B and C Only 264. |
| 338 AT? | Air Transducer related Error. B and C Only 265. |
| 339 ULE | Velocity of Liquid related Error. Table 7, Vliq $\leq$ 19 us/inch, $\geq$ 15 us/inch |
| 340 UAE | Velocity of Air related Error. Table 7, Vair $\leq$ 78 us/inch, $\geq$ 70 us/inch |
| 341 ADE | Error adding A, B and C 273. |

If no measurements (A, B or C) are detected 200, Table 5, an error condition exists. Even in an empty tank, air transducer 36 should work. Therefore, cable 16 may not be connected properly, the transducer assembly 14 may not installed or operating correctly, or there could be a problem with the electronics. An error code of ERR 322, Table 6, is displayed.

If A is greater than the distance to the liquid transducers 212, the liquid level 26a is too low for them to operate. Similarly, if A is greater than or equal to the distance to the liquid transducers 38 less the previous value of Hscum, the liquid level may be too low for the liquid transducers 38 to operate, 212, 213 and 214. In all three cases, if the user requests status, Display Status Exception 2, 310 would be displayed with "LO-" or "LO?" being displayed in place of the liquid level, liq-level-dis. If A is less than the distance to the liquid transducers 38 less the previous value of Hscum, 215 and 216, the liquid level 26a should be high enough for the liquid transducers 38 to at least measure distance C. The liquid transducers 38 or associated electronics may not be working and error code LTE 323 or LT? 324 is displayed.

If distance B is the only distance detected, 220, and B is greater than the distance to the top of reservoir less 6 inches, 221, there may not be enough distance from the top of the liquid 26a or scum 28 to the air transducer 36 for it to operate. If B is greater than the distance to the top of the reservoir less 6 inches and the previous value of Hscum, 222 and 223, there may not be enough distance from the top of the scum 28 to the air transducer 36 for it to operate. In both cases the liquid transducers 38 or associated electronics may not be working and error code HCE 325 or HC? 326 is displayed. If B is less than the distance to the top of the reservoir 16 less 6 inches and the previous value of Hscum, 224 and 225, the air 36 and liquid transducers 38 or associated electronics may not be working and error code ACE 327 or AC? 328 is displayed.

If only distance C is detected, 230, the air transducer 36 and/or liquid transducers 38 or associated electronics may not be working and error code ABE 329 is displayed.

If only distances A and B detected, 240, and the previous valid value of C was greater than 6 inches 241, then the liquid transducers 38 or associated electronics may not be working and error code LCE 330 is displayed. If the previous valid value of C is equal to or less than 6 inches 242, the sludge level may be too high and error code HSE 331 is displayed. If the previous valid C distance is not available, 243, error code HS? 332 is displayed indicating liquid transducers 38 or associated electronics are not working or the sludge level may be too high.

If distances A and C are the only distances detected, 250, and the estimated bottom boundary of the scum 38 (using the previous value of Hscum) or top of the liquid 26a is greater than 6 inches from the liquid transducers 38, 251 and 252, then liquid transducers 38 or associated electronics may not be working and error code LBE 333 or LB? 334 is displayed. If the top of the liquid or bottom of the scum is less than 6 inches from the liquid transducers 38, liquid transducers 38 may not be able to operate, 253 and 254. Display Status Exception 2 310 is used and LO- or LO? is displayed for Liq-level-dis.

If distances B and C are the only distances detected, 260, and the scum or liquid is less than 6 inches from the air transducer 36, 261, 262 and 263, air transducer 36 may not be able to operate and error code HAE 335 or HA? 336 is displayed. If the air transducer is greater than 6 inches away from the scum and liquid, 264 and 265, air transducer 36 or associated electronics may not be working and error code ATE 337 or AT? 338 is displayed.

If all three distances A, B, and C are all present, 270, and the sum of these distances approximately equals the total inside height of the reservoir 16, Hactual, 271, then the tank is essentially empty of solids and is either newly installed or recently cleaned. If the user requests status, display status exception 1 300 would be displayed with "CLE" being displayed in place of Pscum-dis, Psludge-dis and Psolids-dis. If the sum of distances A, B and C is less than the total inside height of reservoir 16, Hactual 272, then the tank is filling with solids. If the sum of the distances A, B, C, Hscum and Hsludge do not approximately equal Hactual, 273, then there is an error detected by adding and error code ADE is displayed.

When all distances A, B, and C are present, the parameters of Table 3 are further tested for service required and alarm required conditions according to Table 7 to determine which, if any, service or alarm conditions require attention.

TABLE 7

Service Required and Alarm Required Tests

| Service Required | Alarm Required (If Alarm Is Enabled) |
|---|---|
| Vair ≥ 78 us/inch | Vair ≥ 78 us/inch |
| Vair ≤ 70 us/inch | Vair ≤ 70 us/inch |
| Vliq ≥ 19 us/inch | Vliq ≥ 19 us/inch |
| Vliq ≤ 15 us/inch | Vliq ≤ 15 us/inch |
| Psolid-dis ≥ 100% | Psolids-dis ≥ 110% |
| scumH ≤ scumH-calc | scumH ≤ scumH-calc * 1.2 |
| scumL ≥ scumL-calc | scumL ≥ scumL-calc * 1.2 |
| liqH ≤ liq-level-dis | liqH ≤ liq-level-dis * 1.2 |
| liqL ≥ liq-level-dis | liq ≥ liq-level-dis * 1.2 |
| sludgeH ≤ Hsludge | sludgeH ≤ sludgeH * 1.1 |

When the air velocity, Vair, is greater than or equal to 78 us/inch or less than or equal to 70 us/inch, error code UAE 340, Table 6, is displayed. Likewise, when the liquid velocity, Vliq, is greater than or equal to 19 us/inch or less than or equal to 15 us/inch, error code ULE 339, Table 6, is displayed. Also, a service required LED 462, FIG. 6, and an alarm 464, FIG. 6, are activated.

When the solids as a percent of total allowable solids, Psolids-dis, reach 100%, the service required LED 462 is activated and floating and bottom solids LEDs 456 and 458, respectively, are activated. When Psolids-dis reaches 110%, the alarm is also activated.

When the calculated high level of the scum, scumH-cal, is equal to or greater than the allowable high level, scumH, the service required LED 462 along with the floating solids LED 456 and Liquid Level LED 460, are activated, while the high scum level is displayed on segment display 466. When scumH-cal reaches 120% of scumH, the alarm 460 is also activated.

When the calculated low level of the scum, scumL-cal, is equal to or less than the allowable low level, scumL, the service required LED 462 and the floating solids LED 456 and liquid level LED 460 are activated, while the low level is displayed on segment display 466. When scumL-cal reaches 120% of scumL, alarm 464 is activated.

When the calculated liquid level, liq-level-dis, is greater than or equal to the allowable liquid level of liqH or less than or equal to the allowable liquid level of liqL, the service required LED 462 and the Liquid Level LED 460 are activated, while the high or low liquid level is displayed on the segment display 466. When liq-level-dis reaches 120% of liqL or liqH, the alarm 464 is also be activated.

When the calculated level of the sludge, Hsludge, is equal to or greater than the setting for the maximum high level of the sludge, sludgeH, the service required LED 462, the bottom solids LED 458, and liquid level LED 460 are activated, while the high level is displayed on the segment display 466. When Hsludge reaches 120% of scumH, the alarm 464 is also be activated if set.

At step 159, FIG. 4, it is determined if the user had desired to display the calculated parameters. If the user had so desired by pressing the display status button 452, FIG. 6, the parameters would be sequentially displayed at step 160. Next, the results from service required and alarm required testing Table 7 are displayed. If there are multiple service and/or alarm required conditions of the worst case severity, they will be sequentially displayed with the last service required or alarm required condition remaining on. Display results exceptions and error codes of Table 6 are displayed as appropriate on the segment displays 466 along with the service required LED 462 and alarm 464, if enabled.

The flow charts for the subroutines for calculating distances A, B and C are shown in FIGS. 5A and 5B. At step 400 it is determined if their is an air echo. If no air echo signals are detected, then air velocity, Vair, and distance A can not be calculated and the program proceeds directly to step 410 and the calculation of the liquid velocity and distances B and C. If at least one air echo has been detected, a second test at step 401 is undertaken to determine if there are two air echoes. If only one echo is detected an additional air transducer test with minimal gain is performed at step 407 by holding off TVG signal 65 so that receive circuitry 42b, FIG. 1, will have minimal gain at the time Echoair1 is received. With minimal gain the receive circuitry 42b is not able to detect the echo from air test reference 36, but is able to detect the surface of the liquid or scum. If Echoair1 is still detected at step 408, then an air velocity of 74 microseconds per inch is used to calculate distance A at step 409. The system then proceeds to step 410 to calculate distances B and C. If Echoair1 is not detected at step 408 then the distance A calculation is not made and the system proceeds directly to step 410 and the calculation of distances B and C.

If at step 401 there are two air echoes detected, the air velocity is calculated at step 402 using Echoair1 and at step 403 distance A is calculated using Echoair2.

In FIG. 5B the system proceeds from step 410 to step 411 where it is determined if there are any liquid B echoes. If no liquid B echoes are detected, then the liquid velocity and the distance B cannot be calculated and the system attempts to proceed to calculate distance C at step 415 with a liquid velocity set at 17 microseconds per inch, step 420. If at least one liquid B echo is detected at step 411, a second test is made to determine if there are at least two liquid B echo returns at step 412. If only one liquid B echo is detected an additional liquid B transducer test with minimal gain is performed at step 417 by holding off TVG signal 65 so that the receive circuitry 42b, FIG. 1, will have minimal gain at the time Echoliqb1 is received. With minimal gain, the receive circuitry 42b is not able to detect the liquid test reference 56, but is able to detect the surface of the liquid or the bottom of the scum layer. If Echoliqb1 is still detected at step 418, then the liquid velocity of 17 microseconds per inch is used to calculate at step 419 an estimated distance for B and then the system proceeds to calculate distance C at step 415. If at step 418 Echoliqb1 is not detected, then the distance B calculation is not made and the system proceeds directly to step 415. If at step 412 there are two liquid B echoes, at step 413 the liquid velocity is calculated and at step 414, distance B is calculated. After distance B is calculated the system proceeds to step 415.

At step 415 a test is made to see if there is a liquid C echo, Echoliqc1. If there is no Echoliqc1, then distance C cannot be calculated and the system proceeds to step 421 and returns to the main routine, FIG. 4. If there is a liquid C echo, Echoliqc1, then distance C is calculated at step 416 with either the liquid velocity (Vliq) derived from Echoliqb1 or an estimated distance C calculated using a liquid velocity, Vliq, of 17 microseconds per inch. At step 421 the system proceeds back to the main routine of FIG. 4.

Installation and initialization of system 10, FIG. 1, involves setting up site specific parameters under which system 10 will operate. After transducer assembly 14 has been properly installed in reservoir 16 and connected to control and interface unit 12, the installer then enters the set-up mode using the control panel 47, FIG. 6, of control and interface unit 12 by depressing and holding down set-up button 450 while simultaneously depressing the display status button 452 and service required acknowledge button 454. The simultaneous sequence is designed to prevent accidentally entering the set-up mode and subsequent potential altering of set-up constants shown in Table (4).

If it is the first time the unit has gone through set-up, all set-up constants of Table (4) will have default settings. Depressing the set-up button 450 will initiate a display/change data sequence. Default settings can be viewed on the segment displays by repeatedly pressing the set-up button 450 to sequence through the individual parameters. Binary combinations of floating solids 456, bottom solids 458, liquid level 460 and service required 462 LEDs along with alarm 464, indicate which parameter is presently being viewed. The parameter presently being viewed by segment displays 466 can be incremented by pressing the service required acknowledge button 454 or decremented by pressing the display status button 452. Simultaneously depressing the display status button 452, service acknowledge button 454 and set up button 450 again will terminate the initialization program and store the parameters in non-volatile memory 44, FIG. 1.

System 10 incorporates two separate methods for determining and alerting when reservoir 16 should get pumped as a result of scum layer 28 and sludge 24, FIG. 1. The first method of determining when the reservoir 16 should get pumped involves levels of scum layer 28 and sludge 24 and their encroachment on the openings of baffle 29. ScumH and ScumL are the maximum levels of the upper and lower boundaries of scum layer 28 relative to Houtlet. SludgeH is defined during set-up in inches relative to the inside bottom of reservoir 16. The second method involves the amount of solids as a percent of reservoir capacity, PsolidsS, which is defined during set-up to be the percent of allowable capacity of solids in relation to reservoir capacity.

Liquid level parameters LiqH and LiqL are also defined in inches during set-up relative to Houtlet and are used to monitor misuse or inadequate system performance.

When any parameters reach the service required threshold, the service required LED display 462 along with the associated parameter LED(s) 456, 458, and 460 are activated and stay activated until the conditions inside reservoir 16 change so that service is no longer required. If service required is not acted on and the parameter in question reaches the alarm required threshold display segment 466 flashes with the status of the parameter and alarm 464 is activated until the alarm required condition has been acknowledged by either service required acknowledge button 454 or through a change in the conditions of reservoir 16 such that the alarm required threshold no longer exists. A user can obtain information regarding the status of reservoir 16 at any time by pressing the display status button 452. Pressing display status button 452 initiates the display of four parameters; namely, floating solids as a percent of allowable solids, Pscum-dis, bottom solids as a percent total allowable solids, Psludge-dis, floating and bottom solids as a percent of total allowable solids, Psolids-dis, and the existing liquid level, liq-level-dis. Each value is sequentially displayed for four seconds while its associated LED is illuminated. The monitoring of the liquid level can help to verify proper installation, prevent over use, identify limited system leaching capacity and leaks in reservoir 16. It can also help prevent floating solids from being modulated up or down and going into outlet 30.

In addition to displaying information that the reservoir should be serviced, system 10 may be used to activate an effluent pump when service is required or to automatically add additive to the reservoir when a predetermined solid or liquid level or thickness is reached.

FIGS. 7A and 7B illustrate other configurations of transducer assembly 14, FIG. 1, which measure one of the boundary levels of scum layer 28 and the liquid level 26a and from these levels calculate the level of the other boundary of scum layer 28. In FIG. 7A, transducer assembly 14a includes liquid transducer unit 500 positioned to monitor both the bottom boundary 34 of scum layer 28 and liquid level 26a in baffle 29. From these two measurements the top boundary 33 of scum layer 28 may be calculated as follows. Distance Ba, from the center of liquid transducer 38 to the liquid/scum interface 34 is calculated similarly to distance B except that the first echo return from transducer unit 500 is used along with 17 us/inch for the liquid velocity. Distance D is calculated using the second echo return from transducer 500. Using the buoyancy of scum, we know that D−Ba=0.73 of Hscum, the scum thickness. Therefore, Hscum=(D−Ba) *1.37 (inches). Using Hscum, calculations involving the top scum boundary relative to the transducer assembly 14 and the reservoir 16 dimensions, the level of the top boundary 33 of scum layer 28 can be calculated. Transducer unit 500 is also used to monitor the level of the sludge layer (not shown). Alternatively, two transducer units 500a and 500b (shown in phantom) may be used. Transducer unit 500a monitors the bottom boundary 34 of scum layer 28 and the sludge layer while transducer unit 500b monitors the liquid level 26a. The top boundary 33 of scum layer 28 may be derived by calculating distances Ba, D and Hscum similarly to when using transducer unit 500 with the exception that the first echo from transducer unit 500a is used in the distance Ba calculations and the first echo from transducer unit 500b is used to calculate distance D.

In FIG. 7B, transducer assembly 14b includes transducer unit 502 positioned to monitor both the top boundary 33 of scum layer 28 and the liquid level 26a. From these levels the bottom boundary 34 of scum layer 28 may be calculated as follows: Distance Aa, from the inside top of reservoir 16 to the top boundary 33 of scum layer 28 is calculated similarly to distance A except that the first echo return from transducer 502 is used along with 74 us/inch for the air velocity. Distance E is calculated using the second echo return from transducer unit 502. Using the buoyancy of scum, we know that Aa−E=0.27 of Hscum, the scum thickness Therefore, Hscum=(Aa−=E)*3.70 (inches). Using Hscum, calculations involving the top scum boundary relative to the transducer assembly 14 and the reservoir 16 dimensions can be calculated. Transducer unit 504 is used to monitor only the level of the sludge layer (not shown). Alternatively, two separate transducer units 502a and 502b (shown in phantom) may be used. Transducer unit 502a monitors the liquid level 26a while transducer unit 502b monitors the top boundary 33 of the scum layer 28. The bottom boundary 34 of scum layer 28 may be derived by calculating distances Aa, E and Hscum similarly to when using transducer unit 502 with the exception that the first echo from transducer unit 502a is used in the distance E calculations and the first echo from transducer unit 502b is used to calculate distance Aa.

Other combinations of transducer units directly interfacing each boundary (not shown) may also be used.

In separation reservoirs, before the floating media begins to form, and in liquid reservoir chambers without a floating media present, liquid level changes may still be desirable and useful to know. The traditional means of detecting liquid level changes is through the use of mechanical floats. These floats are usually tied off at a specific location within the chamber and work with a mercury or other type of switch such that when the liquid level rises and falls, the angle of the float changes causing the switch inside the float to turn on and off. This design has two potential shortcomings. The first is that the required positioning and movement of the float makes it inherently unreliable. The second is that it only turns on and off and cannot detect discrete levels of change. Ultrasonics have been used to detect discrete levels of liquid changes, but using a single transducer does not ensure a highly reliable results over all environmental and liquid level changes.

The use of two (2) transducers, one air transducer in the air or gas directed toward the bottom of the reservoir or chamber and one liquid transducer in the liquid directed toward the top of the reservoir or chamber, provides redundancy in two (2) separate mediums. Thus, if one transducer fails to properly function due to either poor environmental conditions or problems associated with the transducer itself, the other transducer will provide the required liquid level information.

Figure 7C:
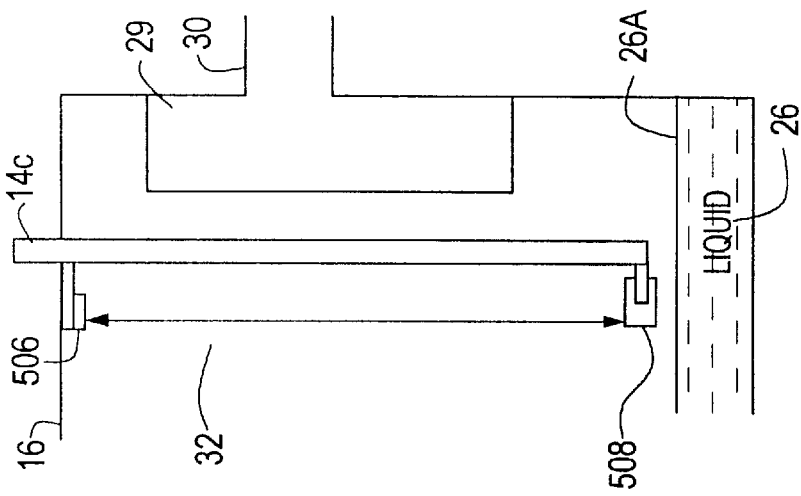
FIG. 7C is a schematic side elevational view of a transducer assembly having two transducers disposed in a reservoir containing only liquid with its surface located between the two transducers.
Figure 7D:
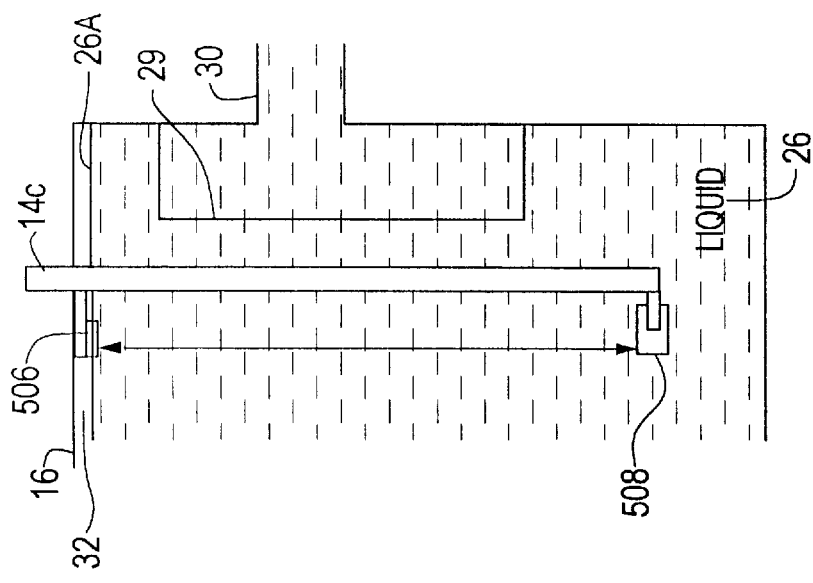
FIG. 7D is a view similar to FIG. 7C except that the surface of the liquid is above the air transducer.
Figure 7E:
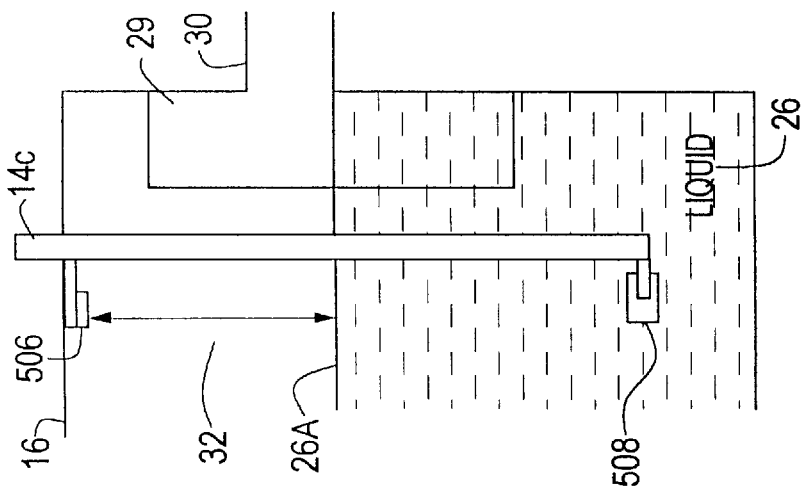
FIG. 7E is a view similar to FIGS. 7C and 7D except that the surface of the liquid is below the level of the liquid transducer.

FIG. 7C illustrates a normal operating liquid reservoir or chamber with liquid level 26a located between air transducer 506 and liquid transducer 508 and both transducers operating normally. FIG. 7D depicts a liquid level 26a which has encroached on the air transducer 506 rendering it inoperable. Liquid transducer 508, however, can function properly to provide the required level information in the manner described above, FIG. 7E depicts liquid level 26a below the liquid transducer 508 rendering it inoperable. Air transducer 506 provides the required liquid level information in the manner described above.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A monitoring system for a separation reservoir containing at least two mediums, at least one medium floating on another medium, comprising:
   means for determining the levels of the upper and lower boundaries of the floating medium;
   means, responsive to said means for determining, for comparing said upper and lower boundary levels to reference levels in the separation reservoir; and
   means, responsive to said means for comparing, for indicating the condition of the contents of the reservoir.

2. The monitoring system of claim 1 in which said means for determining includes first transducer means for determining the level of said upper boundary of the floating medium and second transducer means for determining the level of said lower boundary and means, responsive to said first and second transducer means, for determining the level of a second medium in the reservoir.

3. The monitoring system of claim 1 in which said means for determining includes first transducer means for determining the level of one of the upper and lower boundary levels of the floating medium and second transducer means for determining the level of a second medium and means, responsive to said first and second transducer means, for determining the level of the other of the upper and lower boundary levels of the floating medium.

4. The monitoring system of claim 1 in which said means for determining includes transducer means for determining the level of one of the upper and lower boundaries of the floating medium, means for determining the level of a second medium and means, responsive to the determined level of one of the upper and lower boundaries of the floating medium and the level of the second medium, for determining the level of the other upper and lower boundaries.

5. The monitoring system of claim 1 in which said means for comparing includes means for comparing said upper boundary level to a floating medium upper reference level and for comparing said lower boundary level to a floating medium lower reference level.

6. The monitoring system of claim 5 in which said means for indicating the condition of the reservoir includes means for identifying when either said upper boundary level exceeds said floating medium upper reference level or said lower boundary level falls below said floating medium lower reference level.

7. The monitoring system of claim 6 in which said means for indicating the condition of the reservoir further includes means, responsive to said means for identifying, for displaying that service of the reservoir is required when said upper boundary level exceeds said upper boundary reference level or when said lower boundary level falls below said lower boundary reference level.

8. The monitoring system of claim 5 in which said means for indicating includes means for displaying said upper and lower boundary levels relative to said floating medium upper and lower reference levels.

9. The monitoring system of claim 1 further including means, responsive to said means for determining, for calculating the thickness of the floating medium.

10. The monitoring system of claim 9 in which said means for calculating includes means for comparing the thickness of the floating medium to a predefined floating medium maximum thickness.

11. The monitoring system of claim 9 in which said means for indicating the condition of the reservoir includes means for displaying the thickness of the floating medium in relation to the predefined maximum thickness of the floating medium.

12. The monitoring system of claims 2, 3 or 4 in which said means for comparing includes means for comparing the level of the second medium to a second medium upper reference level and a second medium lower reference level.

13. The monitoring system of claim 12 in which said means for indicating includes means for identifying when the level of said second medium either exceeds said second medium upper reference level or falls below said second medium lower reference level.

14. The monitoring system of claim 13 in which said means for indicating further includes means, responsive to said means for identifying, for displaying that service of the reservoir is required when the level of the second medium exceeds said second medium upper reference level or falls below said second medium lower reference level.

15. The monitoring system of claim 12 in which said means for indicating includes means for displaying the level of said second medium relative to said second medium upper reference level and said second medium lower reference level.

16. The monitoring system of claim 2 in which said second transducer means includes means for determining the level in the reservoir of a third medium accumulated on the bottom of the reservoir.

17. The monitoring system of claim 16 in which said means for determining the level of the third medium includes third transducer means.

18. The monitoring system of claim 3 in which said first transducer means includes means for determining the level in the reservoir of a third medium accumulated on the bottom of the reservoir.

19. The monitoring system of claim 3 in which said means for determining further includes third transducer means for determining the level in the reservoir of a third medium accumulated on the bottom of the reservoir.

20. The monitoring system of claim 4 in which said means for determining includes second transducer means for determining the level in the reservoir of a third medium accumulated on the bottom of the reservoir.

21. The monitoring system of claim 4 in which said transducer means includes means for determining the level in the reservoir of a third medium accumulated on the bottom of the reservoir.

22. The monitoring system of claim 16, 18, 19, 20 or 21 in which said means for comparing includes means for comparing the level of the third medium to a third medium reference level.

23. The monitoring system of claim 22 in which said means for indicating includes means for identifying when the level of said third medium exceeds said third medium reference level.

24. The monitoring system of claim 23 in which said means for indicating includes means, responsive to said means for identifying, for displaying that service of the reservoir is required when the level of said third medium exceeds said third medium reference level.

25. The monitoring system of claim 22 in which said means for indicating includes means for displaying the level of said third medium relative to said third medium reference level.

26. The monitoring system of claim 16, 18, 19, 20 or 21 further including means, responsive to said means for determining the level in the reservoir of the third medium, for calculating the thickness of the third medium in the reservoir.

27. The monitoring system of claim 26 in which said means for calculating includes means for comparing the total thickness of said third medium to a predefined third medium maximum thickness.

28. The monitoring system of claim 27 in which said means for indicating the condition of the reservoir further includes means for identifying when said predefined third medium maximum thickness is exceeded.

29. The monitoring system of claim 28 in which said means for indicating further includes means, responsive to said means for identifying when said predefined third medium maximum thickness is exceeded, for displaying that service of the reservoir is required when the predefined third medium maximum thickness is exceeded.

30. The monitoring system of claim 27 in which said means for indicating includes means for displaying the total thickness of said third medium relative to said predefined third medium maximum thickness.

31. The monitoring system of claim 16, 18, 19, 20 or 21 further including means, responsive to said means for determining, for calculating the thicknesses of said floating medium and said third medium in the reservoir.

32. The monitoring system of claim 31 in which said means for calculating includes means for comparing the combined thickness of said floating medium and said third medium to a predefined maximum combined thickness.

33. The monitoring system of claim 32 in which said means for indicating the condition of the reservoir further includes means for identifying when said predefined maximum combined thickness is exceeded.

34. The monitoring system of claim 33 in which said means for indicating further includes means, responsive to said means for identifying, for displaying that service of the reservoir is required when said predefined maximum combined thickness is exceeded.

35. The monitoring system of claim 32 in which said means for indicating includes means for displaying the combined thickness of said floating medium and said third medium relative to said predefined maximum combined thickness.

36. The monitoring system of claim 1 in which said floating medium is a scum layer.

37. The monitoring system of claims 2, 3 or 4 in which said second medium is a liquid.

38. The monitoring system of claim 16, 18, 19, 20 or 21 in which said third medium is a sludge layer.

39. The monitoring system of claim 1 in which said separation reservoir is a septic tank.

40. The monitoring system of claim 1 in which said means for determining includes first transducer means for determining the level of said upper boundary of the floating medium and second transducer means for determining the level of said lower boundary of the floating medium.

41. An automatic monitoring system for determining the level of three medium interfaces formed by four different mediums in a reservoir, comprising:

first transducer means positioned proximate the first medium interface for directing a first detection signal toward the first medium interface and for receiving said first detection signal reflected from said first medium interface;

second transducer means positioned proximate the second medium interface for directing a second detection signal toward the second medium interface and for receiving said second detection signal reflected from said second medium interface;

third transducer means positioned proximate the third medium interface for directing a third detection signal toward the third medium interface and for receiving said third detection signal reflected from said third medium interface;

calculator means, responsive to said first, second and third transducer means, for determining the levels of said three medium interfaces in the reservoir; and indicator means, responsive to the levels of said three medium interfaces, for indicating the condition of the contents of the reservoir.

42. A liquid level monitoring system for a reservoir adapted for containing a liquid comprising:

an air transducer means for directing a first detection signal toward the bottom of the reservoir and for receiving a reflected first detection signal;

a liquid transducer means, diametrically opposed to said air transducer means, for directing a second detection signal toward the top of the reservoir and for receiving a reflected second detection signal; and calculator means, responsive to said first and second transducers means, for determining the level of liquid in the reservoir.

* * * * *